United States Patent
Morita et al.

(10) Patent No.: US 10,038,641 B2
(45) Date of Patent: Jul. 31, 2018

(54) FLOW CONTROL DEVICE, COMMUNICATION SYSTEM, CONTROL METHOD FOR FLOW CONTROL DEVICE, AND PROGRAM

(71) Applicant: NEC Corporation, Tokyo (JP)

(72) Inventors: Gen Morita, Tokyo (JP); Shuichi Karino, Tokyo (JP); Yoshinori Saida, Tokyo (JP); Yoshikazu Watanabe, Tokyo (JP); Takahiro Iihoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/125,883

(22) PCT Filed: Mar. 11, 2015

(86) PCT No.: PCT/JP2015/001335
§ 371 (c)(1),
(2) Date: Sep. 13, 2016

(87) PCT Pub. No.: WO2015/136928
PCT Pub. Date: Sep. 17, 2015

(65) Prior Publication Data
US 2017/0005937 A1    Jan. 5, 2017

(30) Foreign Application Priority Data
Mar. 14, 2014    (JP) ................................ 2014-050987

(51) Int. Cl.
    *G01R 31/08*     (2006.01)
    *H04B 7/14*     (2006.01)
    (Continued)

(52) U.S. Cl.
    CPC .......... *H04L 47/18* (2013.01); *H04L 12/6418* (2013.01); *H04L 43/0864* (2013.01); *H04L 65/608* (2013.01)

(58) Field of Classification Search
    CPC . H04L 47/22; H04L 47/2416; H04L 47/2483; H04L 47/33; H04L 43/0876
    See application file for complete search history.

(56) References Cited

U.S. PATENT DOCUMENTS

| | | | |
|---|---|---|---|
| 2006/0002292 A1* | 1/2006 | Chang ................... | H04L 12/462 370/225 |
| 2006/0092973 A1* | 5/2006 | Petrovic ................ | H04L 1/1822 370/469 |

(Continued)

FOREIGN PATENT DOCUMENTS

| | | |
|---|---|---|
| EP | 2654254 A1 | 10/2013 |
| JP | 2009-124548 A | 6/2009 |

(Continued)

OTHER PUBLICATIONS

Yutaka Takahashi, et al., "Dynamic Resource Allocation with OpenFlow for Bursty Load," IEICE Technical Report, vol. 113, No. 472, Feb. 27, 2014, 7 pages.

(Continued)

*Primary Examiner* — Faruk Hamza
*Assistant Examiner* — Abu-Sayeed Haque
(74) *Attorney, Agent, or Firm* — Wilmer Cutler Pickering Hale and Dorr LLP

(57) ABSTRACT

There is provided a flow control device for controlling flow control rules defining processing contents per flow in a packet transfer device for processing packets belonging to a flow between a first communication device and a second communication device, which receives a packet reception notification indicating that the packet transfer device receives a packet from at least one of the first communica- (Continued)

tion device and the second communication device from the packet transfer device, determines a flow control rule to be notified to the packet transfer device in response to the received packet reception notification, manages a packet reception notification reception time when the packet reception notification is received, and calculates a first round-trip transmission delay time between two devices among the first communication device, the second communication device, and the packet transfer device based on the packet reception notification reception times.

5 Claims, 19 Drawing Sheets

(51) Int. Cl.
*H04L 12/28* (2006.01)
*H04L 12/801* (2013.01)
*H04L 12/64* (2006.01)
*H04L 12/26* (2006.01)
*H04L 29/06* (2006.01)

(56) References Cited

U.S. PATENT DOCUMENTS

| | | | | |
|---|---|---|---|---|
| 2007/0165515 A1* | 7/2007 | Vasseur | ............... | H04L 12/66 370/216 |
| 2007/0211714 A1* | 9/2007 | Metke | ............... | H04L 29/12066 370/389 |
| 2007/0280102 A1* | 12/2007 | Vasseur | ............... | H04J 3/14 370/225 |
| 2008/0049633 A1* | 2/2008 | Edwards | ............ | H04L 43/0852 370/252 |
| 2010/0067489 A1* | 3/2010 | Pelletier | ............... | H04W 48/17 370/331 |
| 2011/0087915 A1* | 4/2011 | Zhang | ............... | H04L 12/1854 714/2 |
| 2013/0258898 A1 | 10/2013 | Gao et al. | | |
| 2014/0281809 A1* | 9/2014 | Billa | ............... | G06F 17/30327 714/764 |
| 2016/0043941 A1* | 2/2016 | D'Heureuse | ........ | H04L 41/0896 370/390 |

FOREIGN PATENT DOCUMENTS

| | | |
|---|---|---|
| JP | 2013-106305 A | 5/2013 |
| JP | 2013-197840 A | 9/2013 |
| WO | WO-2011-118574 A1 | 9/2011 |
| WO | WO-2012-081549 A1 | 6/2012 |

OTHER PUBLICATIONS

Nick McKeown and et al., "OpenFlow: Enabling Innovation in Campus Networks," Internet (URL: http://www.openflowswitch.org/documents/openflow-wp-latest.pdf), Mar. 14, 2008, 6 pages.

"OpenFlow Switch Specification" Version 1.0.0., (Wire Protocol 0x01), Internet URL: http://www.openflowswitch.org/documents/openflow-spec-v1.0.0.pdf), Dec. 31, 2009, 42 pages.

Tohru Takesue and et al., "Topics in Policy Server and Activity of Hitachi," Technical Report Order Information of the Institute of Electronics, Information and Communication Engineers, The Institute of Electronics, Information and Communication Engineers, Oct. 13, 2000, vol. 100, No. 378, pp. 31-38.

International Search Report corresponding to PCT/JP2015/001335 dated May 26, 2015, 5 pages.

* cited by examiner

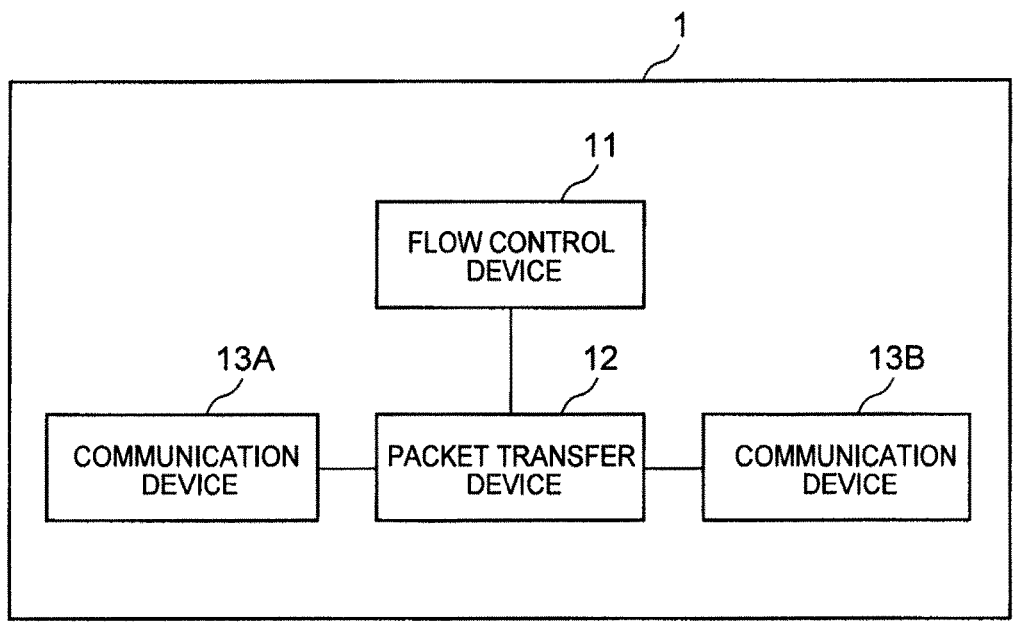
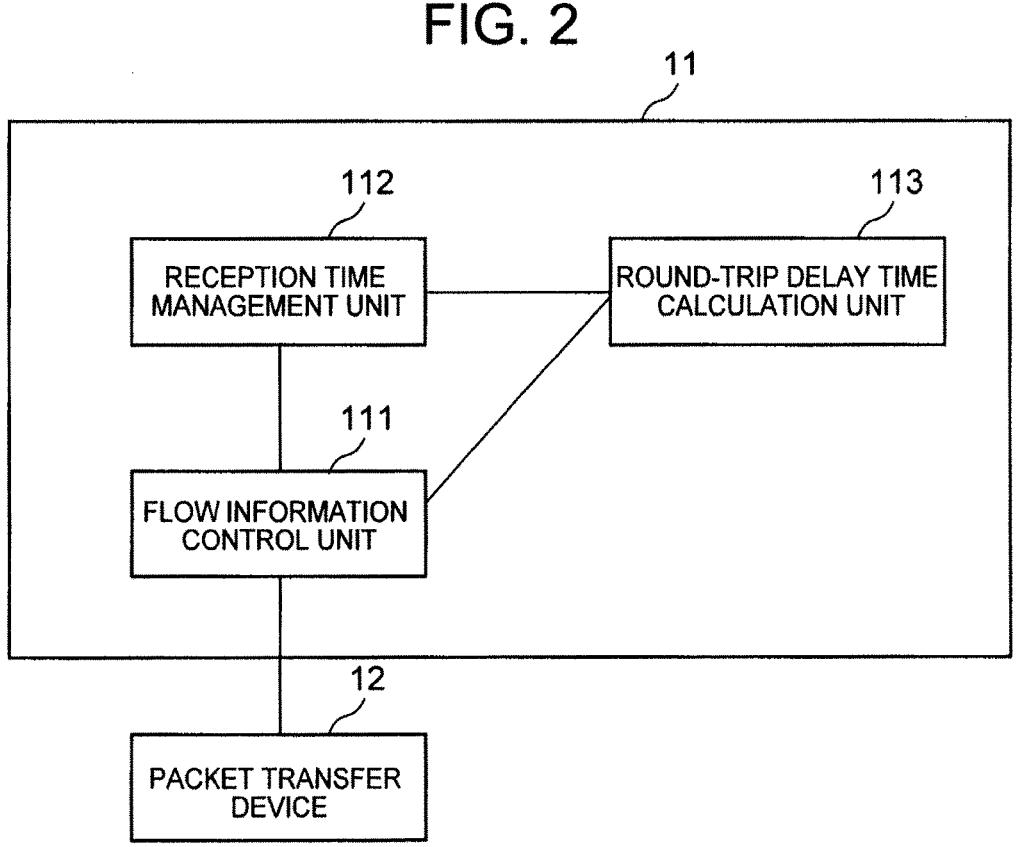

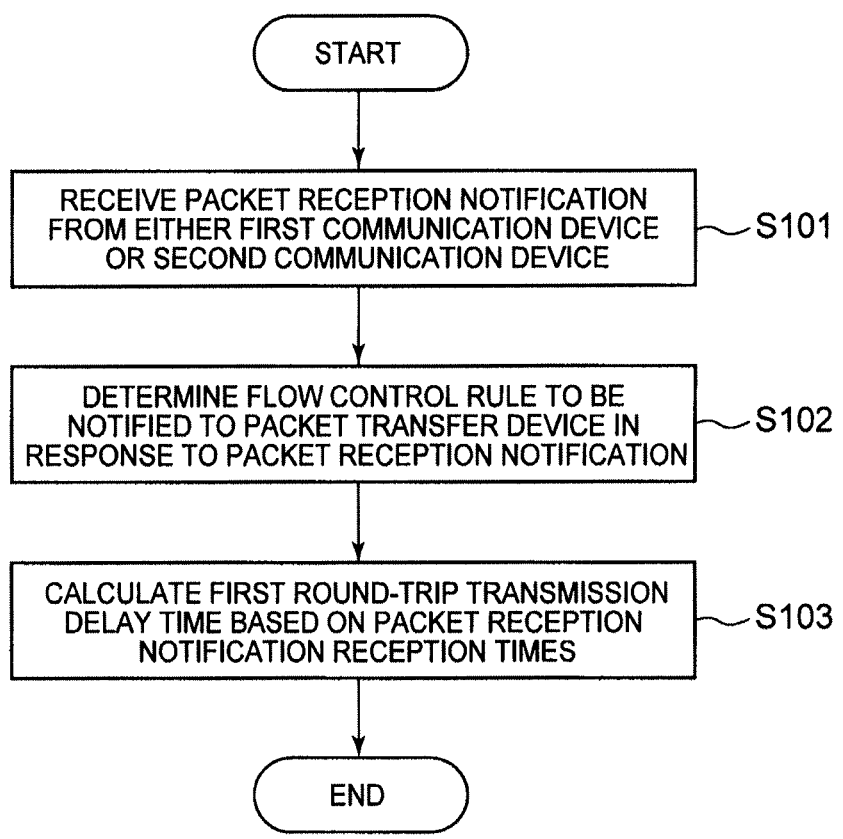

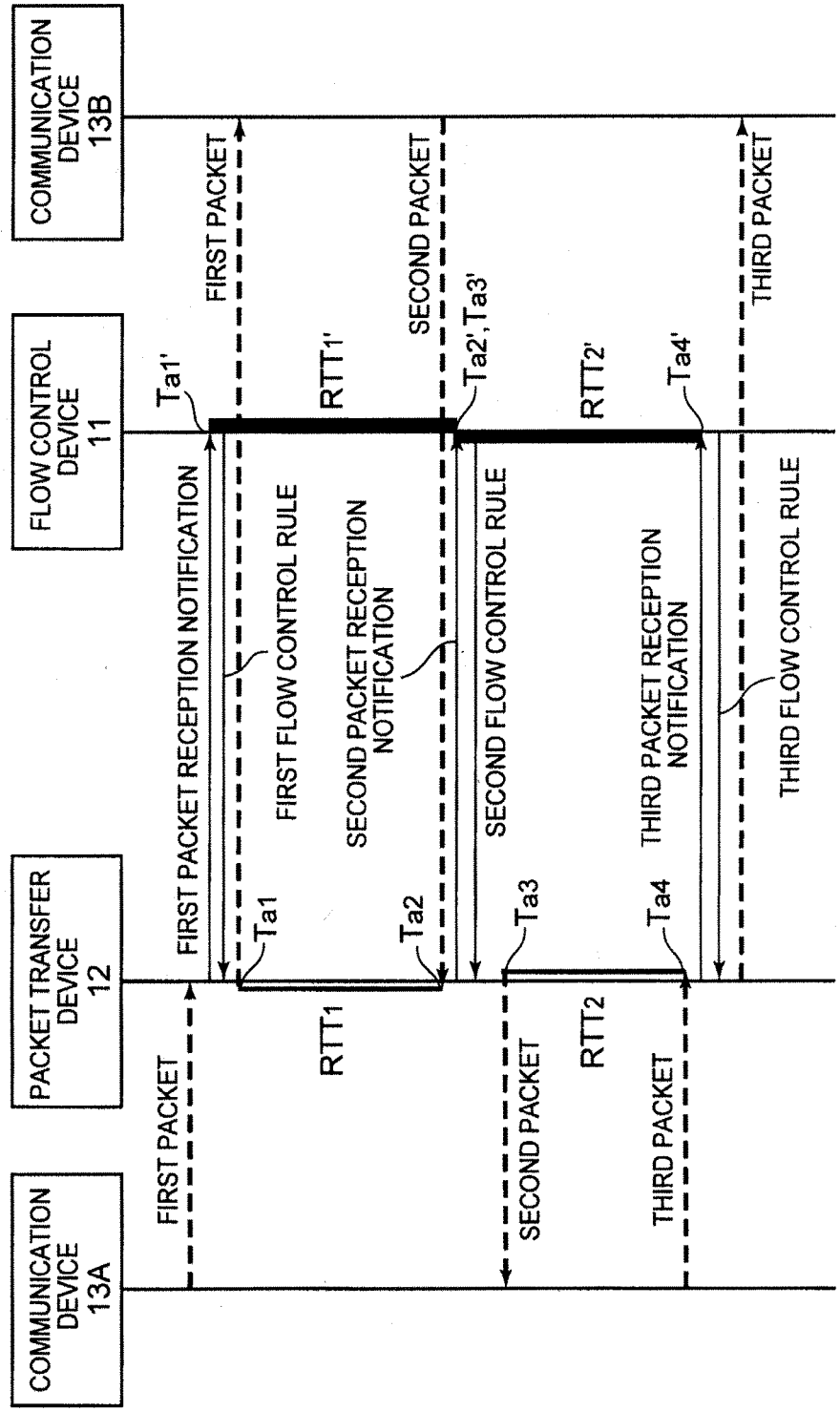

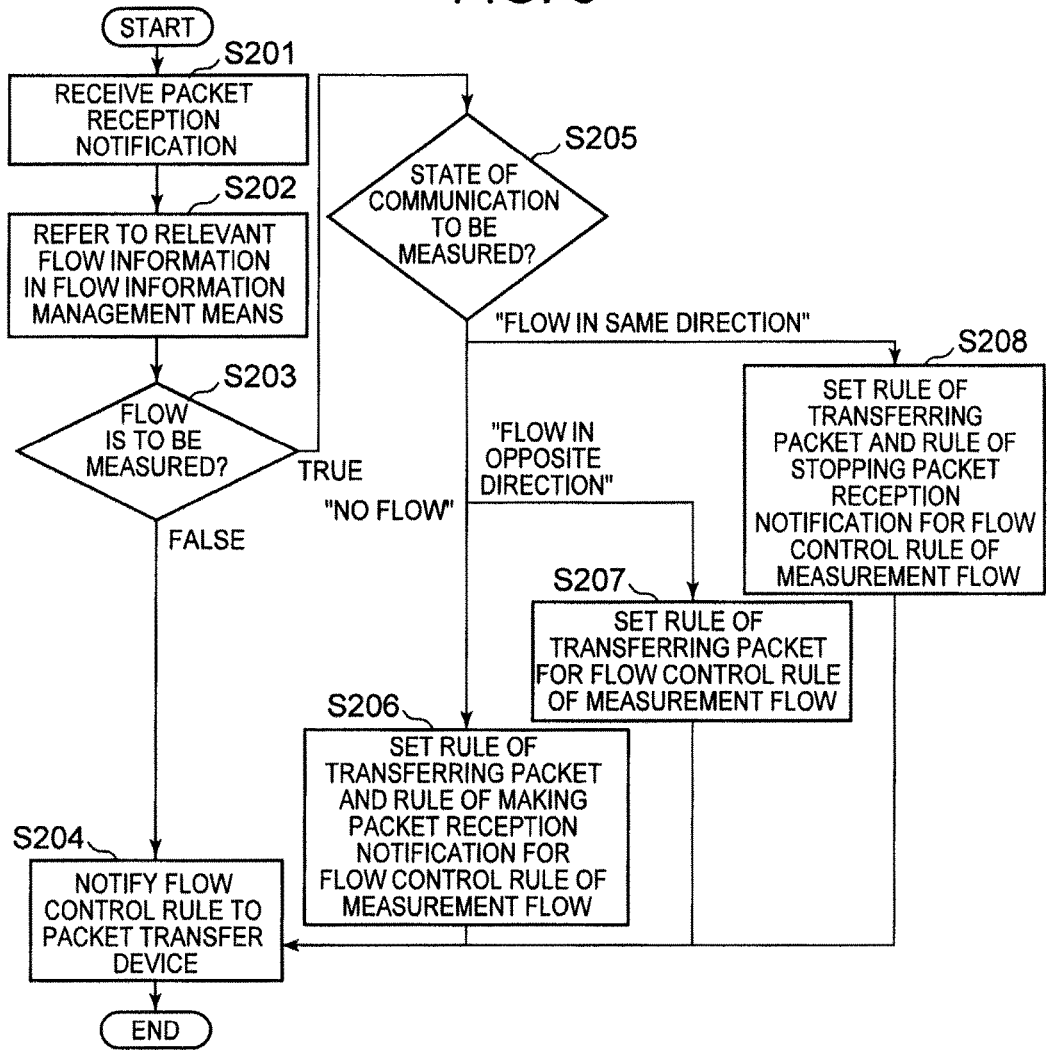

FIG. 10

| COMMUNICATION IDENTIFIER | FLOW IDENTIFIER | PACKET RECEPTION NOTIFICATION RECEPTION TIME |
|---|---|---|
| A | 13ab | Ta1 |
| A | 13ba | Ta2 |
| ... | ... | ... |
| ... | ... | ... |

FIG. 11

| COMMUNICATION IDENTIFIER | FLOW IDENTIFIER | PACKET RECEPTION NOTIFICATION RECEPTION TIME |
|---|---|---|
| A | 13ab | Ta1 |
| A | 13ba | Ta2 |
| A | 13ab | Ta3 |
| ... | ... | ... |

HEADER FIELDS; MATCHING RULE

| Wildcards | In Point | Ether SA | Ether DA | Ether type | VLAN ID | VLAN PCP | IP SA | IP DA | IP proto | IP ToS bits | TCP/UDP src port | TCP/UDP dst port | Counters | Actions |
|---|---|---|---|---|---|---|---|---|---|---|---|---|---|---|

FLOW CONTROL DEVICE, COMMUNICATION SYSTEM, CONTROL METHOD FOR FLOW CONTROL DEVICE, AND PROGRAM

CROSS-REFERENCE TO RELATED APPLICATIONS

This application is a national stage application of International Application No. PCT/JP2015/001335 entitled "Flow Control Device, Communication System, Control Method For Flow Control Device, and Program" filed on Mar. 11, 2015, which claims priority to Japanese Application No. 2014-050987 filed on Mar. 14, 2014, the disclosures of which are hereby incorporated by reference in their entirety.

TECHNICAL FIELD

The present invention relates to a flow control device, a communication system, a method for controlling the flow control device, and a program.

BACKGROUND ART

There have been developed techniques for measuring a transmission delay in communication in a flow control device at a higher level than a packet transfer device. One of the techniques is a system which is configured of an OpenFlow controller (OFC) as flow control device and an OpenFlow switch (OFS) as packet transfer device by use of OpenFlow and in which the OFC measures a transmission delay in the OFS between two points (see PTL 1 and NPLs 1 and 2).

OpenFlow is a technique in which communication is assumed as end-to-end flow and control such as path control, failure recovery, load distribution or optimization is conducted in units of flow. A flow is identified communication in combination of items of information obtained when the switch receives a packet. For example, flows, which have the same transmission source/transmission destination based on internet protocol (IP) header information and different transmission control protocol (TCP) port numbers, can be handled as different flows. For example, flows, which have the same packet information and different reception physical ports, can be handled as different flows. Communication is managed in units of flow thereby to realize control and management over independent layers. The OFS specified in NPL 2 includes a secure channel for communication with the OFC. Further, the OFS operates according to a flow table. The flow table is added or rewritten in response to an instruction from the OFC via the secure channel. The flow table defines therein a set of matching rule (header field) collated with packet header, flow statistical information (Counters), and action defining processing contents per flow. The OFS has a function of notifying reception of a packet to the OFC. A relevant matching rule may not be present in the flow table as a cause of the notification. Further, a matching rule may be present in the flow table and notification to the OFC may be designated in the action as other cause of the notification. A form of the notification message employs a Packet-in message defined in OpenFlow Protocol (OFP). The message may include part of a packet including the header information of the packet of cause, or the entirety thereof.

With the system in PTL 1, the OFC controls OFSs to be measured at two points. Specifically, the OFC controls the OFS at the start point to transmit a transmission delay measurement packet to the OFS at the end point by use of a Packet-out message in OFP. Further, the OFS controls the OFS at the end point to notify reception of the transmission delay measurement packet to the OFC. The OFC measures a time when the Packet-out is transmitted and a time when the transmission delay measurement packet reception notification is made, and manages them as transmission delay information between the two points, thereby finding a communication path with less delay. Further, the transmission delay measurement is bi-directionally made between the two points, thereby measuring round trip time (RTT) between the two points.

PTL 2 discloses therein, not an OpenFlow technique, a delay time measurement device which is connected to a packet relay device for relaying packets transmitted between terminals and is directed for measuring a transmission delay time between the terminals and the packet relay device. Specifically, when a packet to be relayed is a real-time transport control protocol (RTCP) packet, the packet relay device outputs a copy of the RTCP packet to a computer. The computer obtains a packet reception time each time a copy of the RTCP packet is input therein, and calculates a round-trip transmission delay time based on the obtained reception time.

CITATION LIST

Patent Literature

PTL 1: WO 2011/118574 A1
PTL 2: Japanese Patent Application Laid-Open No. 2009-124548

Non Patent Literature

NPL 1: Nick McKeown and et al., "OpenFlow: Enabling Innovation in Campus Networks" [online], [searched on Jan. 9, 2013], Internet (URL: http://www.openflowswitch.org/documents/openflow-wp-latest.pdf)
NPL 2: "OpenFlow Switch Specification" Version 1.0.0. (Wire Protocol 0x01) [searched on Jan. 9, 2013] Internet (URL: http://www.openflowswitch.org/documents/openflow-spec-v1.0.0.pdf)
NPL 3: Tohru Takesue and three others, "Topics in Policy Server and Activity of Hitachi," Technical Report Order Information of The Institute of Electronics, Information and Communication Engineers, The Institute of Electronics, Information and Communication Engineers, Oct. 13, 2000, Vol. 100, No. 378, p. 31-38

SUMMARY OF INVENTION

Technical Problem

The following analysis is given by the present invention. A device at an endpoint of communication may be denoted as end user below.

The technique described in PTL 1 needs at least two control points required by the OFC for measuring a transmission delay time, and thus there is a problem that RTT between end users cannot be measured.

This is because the technique described in PTL 1 requires that the devices at both ends of a period to be measured have either a function of transmitting a transmission delay measurement packet or a function of notifying reception of a transmission delay measurement packet to the OFC. Further, the technique described in PTL 1 is directed for measuring a one-way transmission delay time from the start point to the end point of a period to be measured, and requires that the devices at both ends of the period to be measured include the two control functions in order to measure a round-trip transmission delay. Further, unlike the OFS controlled by the OFC, the end users are out of the OFC control, and thus they do not necessarily have the above functions and are not controlled by the OFC.

With the technique described in PTL 1, a transmission delay measurement packet transmitted from the OFC is transmitted between the OFSs, and thus there is a problem that a network use efficiency between the OFSs is deteriorated.

This is because a transmission delay measurement packet needs to be transmitted between the OFSs unlike communication between transfer end users, and the transmission delay measurement packet presses against a band or throughput of communication between the end users. Further, when a network between the OFS and the end user is a wireless access network, it is susceptible to wireless environments such as degree of wireless quality, and a delay cause is different per end user. Therefore, the measurement is required at the end users, and a network use efficiency is further deteriorated due to an increase in transmission delay measurement packets in a wireless period.

Further, with the technique described in PTL 2, when a packet relayed by the packet transfer device is a RTCP packet, the packet transfer device needs to create a copy of the RTCP packet, and thus there is a problem that a function therefor needs to be newly mounted.

Object of the Invention

It is an object of the present invention to provide a communication system capable of measuring RTT between end users at one control point without deteriorating a network use efficiency.

Solution to Problem

To achieve the above object, the present invention is a flow control device for controlling flow control rules defining processing contents per flow in a packet transfer device for processing packets belonging to a flow between a first communication device and a second communication device, including: a flow information control means which receives a packet reception notification indicating that the packet transfer device receives a packet from either the first communication device or the second communication device from the packet transfer device, and determines a flow control rule to be notified to the packet transfer device in response to the received packet reception notification; a reception time management means which manages a packet reception notification reception time when the packet reception notification is received; and a calculation means which calculates a first round-trip transmission delay time between two devices among the first communication device, the second communication device, and the packet transfer device based on the packet reception notification reception times.

Further, the present invention is a flow control device for controlling flow control rules defining processing contents per flow in a packet transfer device for processing packets belonging to a flow between a first communication device and a second communication device, and is characterized in that a notification that the packet transfer device receives a first TCP packet from the first communication device is received as Packet-in message from the packet transfer device and a Flowmod message may not be transmitted to the packet transfer device in response to the Packet-in message.

Further, the present invention is a flow control device for controlling flow control rules defining processing contents per flow in a packet transfer device for processing packets belonging to a flow between a first communication device and a second communication device, and is characterized in that a notification that the packet transfer device receives a first TCP packet from the first communication device is received as Packet-in message from the packet transfer device and a rule of transmitting the Packet-in message to the flow control device again when the packet transfer device receives again a packet belonging to the same flow as the flow to which the first TCP packet belongs is set for the flow control rule and notified to the packet transfer device.

Further, the present invention is a flow control device for controlling flow control rules defining processing contents per flow in a packet transfer device for processing packets belonging to a flow between a first communication device and a second communication device, including: a flow information control means which receives a packet reception notification indicating that the packet transfer device receives a packet from either the first communication device or the second communication device from the packet transfer device, and determines a flow control rule to be notified to the packet transfer device in response to the received packet reception notification; a reception time management means which manages a packet reception notification reception time when the packet reception notification is received; and a calculation means which calculates a temporal difference between the packet reception notification reception times.

Further, the present invention is a communication system including: a first communication device; a second communication device; a packet transfer device for processing packets belonging to a flow between the first communication device and the second communication device; and a flow control device for controlling flow control rules defining processing contents per flow in the packet transfer device, wherein the packet transfer device includes means for transmitting a packet reception notification indicating that it receives a packet from either the first communication device or the second communication device to the flow control device, and the flow control device includes: a flow information control means which determines a flow control rule to be notified to the packet transfer device in response to the packet reception notification received from the packet transfer device; a reception time management means which manages a packet reception notification reception time when the packet reception notification is received; and a calculation means which calculates a first round-trip transmission delay time between two devices among the first communication device, the second communication device, and the packet transfer device based on the packet reception notification reception times.

Further, the present invention is a method for controlling a flow control device for controlling flow control rules defining processing contents per flow in a packet transfer device for processing packets belonging to a flow between a first communication device and a second communication device, the method including the steps of: receiving a packet reception notification indicating that the packet transfer device receives a packet from either the first communication device or the second communication device from the packet transfer device; determining a flow control rule to be notified to the packet transfer device in response to the received packet reception notification; and calculating a first round-trip transmission delay time between two devices among the first communication device, the second communication device, and the packet transfer device based on the packet reception notification reception times.

Further, the present invention is a program for causing a computer to perform a method for controlling a flow control device for controlling flow control rules defining processing contents per flow in a packet transfer device for processing packets belonging to a flow between a first communication device and a second communication device, the method including the steps of: receiving a packet reception notification indicating that the packet transfer device receives a packet from either the first communication device or the second communication device from the packet transfer device; determining a flow control rule to be notified to the packet transfer device in response to the received packet reception notification; and calculating a first round-trip transmission delay time between two devices among the first communication device, the second communication device, and the packet transfer device based on the packet reception notification reception times.

Advantageous Effects of Invention

According to the present invention, it is possible to provide a communication system capable of measuring RTT between end users at one control point without deteriorating a network use efficiency.

This is because a round-trip transmission delay time in the measurement period can be approximated based on a time when the flow control device receives a packet reception notification from the packet transfer device.

BRIEF DESCRIPTION OF DRAWINGS

FIG. 1 It depicts a diagram illustrating a structure of a communication system according to a first exemplary embodiment.

FIG. 2 It depicts a diagram illustrating a structure of a flow control device according to the first exemplary embodiment.

FIG. 3 It depicts a diagram illustrating a flowchart of the operations according to the first exemplary embodiment.

FIG. 4 It depicts a diagram illustrating a sequence between devices according to the first exemplary embodiment.

FIG. 8 It depicts a diagram illustrating a flowchart of the operations according to the second exemplary embodiment.

FIG. 9 It depicts a diagram illustrating exemplary information on communication to be measured according to the second exemplary embodiment.

FIG. 10 It depicts a diagram illustrating exemplary information on communication to be measured according to the second exemplary embodiment.

FIG. 11 It depicts a diagram illustrating exemplary information on communication to be measured according to the second exemplary embodiment.

DESCRIPTION OF EMBODIMENTS

Figure 5:
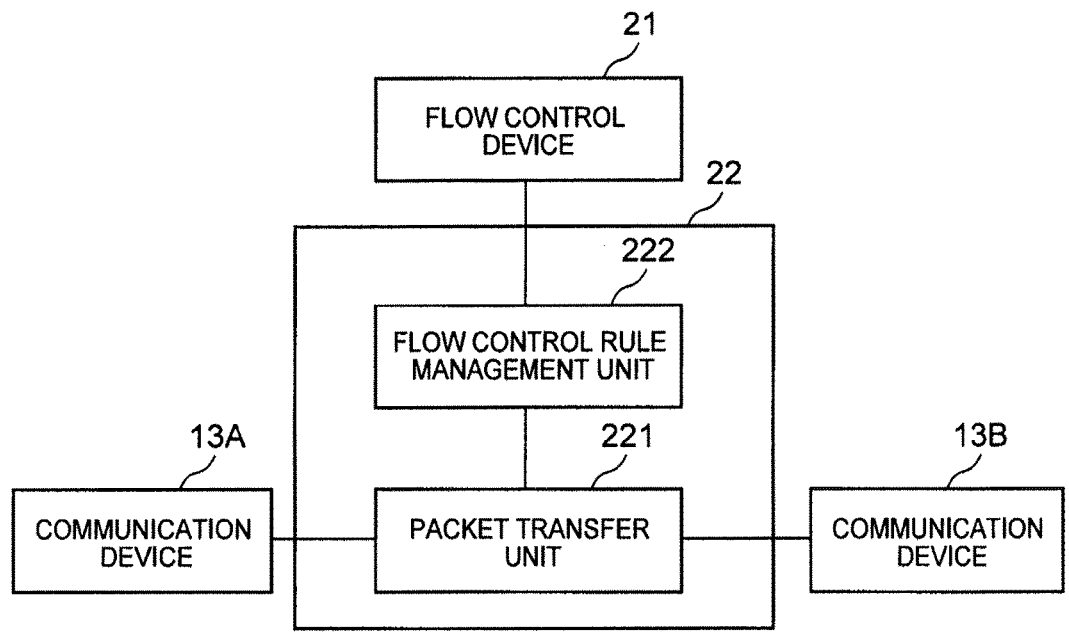
FIG. 5 It depicts a diagram illustrating a structure of a packet transfer device according to a second exemplary embodiment.

Exemplary embodiments of the present invention will be described below with reference to the drawings. Throughout the drawings, the same or corresponding components are denoted with the same reference numerals, and a repeated description thereof will be omitted as needed for simplified description.

First Exemplary Embodiment

Structure

A first exemplary embodiment of the present invention will be described with reference to the drawings.

FIG. 1 is a diagram illustrating a structure of a communication system according to the present exemplary embodiment of the present invention. A communication system 1 according to the first exemplary embodiment of the present invention includes a flow control device 11, a packet transfer device 12, a communication device 13A (first communication device), and a communication device 13B (second communication device).

The flow control device 11 is communicable with the packet transfer device 12, and controls flow control rules held in the packet transfer device 12 based on a packet reception notification from the packet transfer device 12.

The packet transfer device 12 is communicable with the flow control device 11, the communication device 13A, and the communication device 13B. The packet transfer device 12 transfers packets received from the communication device 13A or the communication device 13B according to a flow control rule set by the flow control device 11. More specifically, the packet transfer device 12 associates a communication identifier specifiable per communication device or part of it with a flow control rule for management. Then, when receiving a packet, the packet transfer device 12 obtains a flow control rule in the packet transfer device 12 by use of the communication identifier included in the packet or part of it, and transfers the packet according to the flow control rule.

Further, when receiving a packet from the communication device 13A or the communication device 13B, the packet transfer device 12 can transmit a packet reception notification indicating reception of the packet to the flow control device 11. The packet transfer device 12 may transmit the packet reception notification to the flow control device 11 by transmitting the received packet to the flow control device 11 by use of a predetermined protocol. Further, the packet transfer device 12 may transmit a copy of the received packet to the flow control device 11. When transmitting a copy of the received packet to the flow control device 11, the packet transfer device 12 needs to save the original packet in a storage medium such as memory in the packet transfer device 12. This is directed for causing the packet transfer device 12 to transfer the received packet based on the flow control rule transmitted from the flow control device 11.

The packet transfer device 12 transmits a packet reception notification to the flow control device 11 under various assumed conditions. For example, it is assumed that a flow control rule corresponding to the communication identifier included in a packet received from the communication device 13A or the communication device 13B or part of it is not set in the packet transfer device 12. In this case, the packet transfer device 12 transmits a packet reception notification to the flow control device 11 in order to ask a corresponding rule. Further, as described in NPL 3, when receiving a band reservation request for ensuring quality of service (QoS) from the communication device 13, the packet transfer device 12 may transmit the request to the flow control device 11 in order to perform consistent resource management in the entire network.

The communication identifier includes identifier of a physical port (Input Port) receiving the packet in the packet transfer device, destination address included in the header region of the packet, transmission source address, destination port number, transmission source port number, and communication protocol type. The addresses are assumed to include a media access control (MAC) address or an internet protocol (IP) address. The communication identifier is merely exemplary, and any identifier required for identifying communication is assumed as communication identifier according to the present invention. A communication identifier included in a packet or part of it will be denoted as flow identifier below.

The packet transfer device 12 according to the present invention may employ any packet transfer device for transferring packets of a flow. The flow control device 11 according to the present invention may employ any flow control device for controlling the flow control rules in the packet transfer device 12. The communication protocols used for the packet transfer device 12 or the flow control device 11, or architectures of the devices are not limited. For example, when OpenFlow is employed, the flow control device 11 corresponds to an OFC and the packet transfer device 12 corresponds to an OFS. Further, in the policy-base network management technique, the flow control device 11 corresponds to a policy server having policy decision point (PDP), and the packet transfer device 12 corresponds to a node having policy enforcement point (PEP). The policy-base network management technique is a technique for intensively controlling and managing a group of communication devices based on an operation rule denoted as policy (NPL 3).

The communication device 13A and the communication device 13B are general-purpose communication devices having a protocol by which they can make communication with each other via the packet transfer device 12, and make communication by use of communication identifiers. The communication devices may be wireless terminals such as cell phone and Smartphone, or wired terminals such as wired computer. Further, the communication devices may be not only the client nodes but also host nodes such as server. In the following, the communication device 13 indicates the communication device 13A or the communication device 13B. Further, the communication device 13 is an endpoint of communication for the flow control device 11, and may actually have the same functions as the packet transfer device 12. Further, a one-way flow between the communication device 13A and the communication device 13B to be measured according to the present invention will be denoted as flow to be measured, and bi-directional communication made of a plurality of flows to be measured will be denoted as communication to be measured.

FIG. 2 is a diagram illustrating an exemplary structure of the flow control device 11 according to the first exemplary embodiment of the present invention. The flow control device 11 includes a flow information control unit 111 as flow information control means for controlling a flow control rule of the packet transfer device 12, a reception time management unit 112 as reception time management means for managing a time when a packet reception notification is received from the packet transfer device 12, and a round-trip delay time calculation unit 113 as calculation means for calculating a round-trip delay time or the like between any devices based on a packet reception time. FIG. 2 illustrates only the essential components according to the present exemplary embodiment among the functional blocks included in the flow control device 11. That is, though not illustrated, the flow control device 11 may include a functional block for causing the flow control device 11 to function as a device for controlling the flow control rules provided in the packet transfer device. An exemplary functional block is a function unit for holding a flow control rule corresponding to a flow identifier and answering a flow control rule in response to an inquiry of the flow control rule from other function unit. The presence of transmission delay time measurement may be set in a flow control rule.

The flow information control unit 111 determines a flow control rule of receiving a packet reception notification indicating that the packet transfer device 12 receives a packet from the communication device 13 from the packet transfer device 12, and making a notification to the packet transfer device 12 in response to the received packet reception notification. In OpenFlow, a Packet-in message defined in OFP may be used as packet reception notification.

Various rules may be set for the flow control rules notified to the packet transfer device 12. The rules to be set may include a rule of transferring a packet as a cause of a packet reception notification to the flow control device 11 from the packet transfer device 12 to the destination indicated by a flow identifier. In the case of OpenFlow, the rule is realized by the OFC which transmits a Packet-out message to the OFS in response to the Packet-in message received from the OFS. Further, the rules to be set may be a rule of, when the packet transfer device 12 receives again a packet belonging to the same flow as the flow to which the packet as a cause of the packet reception notification belongs, transferring the packet without transmitting a packet reception notification to the flow control device 11. In the case of OpenFlow, the rule is realized by transmitting, to the OFS, a flow entry including an operation (output action) of transferring a packet belonging to the same flow as the packet as a cause of the packet reception notification to the communication device 13B by use of a Flowmod message in response to the Packet-in message received from the OFS. Further, the rules to be set may be a rule of, when the packet transfer device 12 receives again a packet belonging to the same flow as the flow to which the packet as a cause of the packet reception notification to the flow control device 11 belongs, making the packet reception notification to the flow control device 11 again. In the case of OpenFlow, the rule is realized by transmitting a Packet-out message to the OFS while the OFC does not send a Flowmod message in response to the Packet-in message received from the OFS. This is because when the OFS receives the packet belonging to the same flow again while the Flowmod message is not transmitted from the OFC, a corresponding flow entry is not set in the OFS and the Packet-in message is transmitted again to the OFC. Further, a flow entry including the operation (output action) of transferring a packet belonging to the same flow as the packet as a cause of the packet reception notification to the communication device 13B and an operation (controller action) of notifying reception of a packet to the OFC is held in the OFS by use of a Flowmod message so that the packet reception notification can be made again. As described above, in the case of OpenFlow, the flow control rules are realized in a combination of messages defined in OFP such as Packet-out message and Flowmod message. A rule may be generated in combination with other messages defined in OFP.

Further, the flow information control unit 111 may obtain a flow control rule previously held in a function unit (not illustrated) provided in the flow control device 11 from the function unit, or may obtain a flow control rule processed by the round-trip delay time calculation unit 113. For example, while OpenFlow is applied to the present communication system, when the OFS receives again a packet belonging to the same flow, the flow information control unit 111 may obtain a flow control rule of transmitting the Packet-in message to the OFC again from the round-trip delay time calculation unit 113. According to the present invention, determining a flow control rule indicates determining which flow control rule to obtain from among the flow control rules previously held in the function unit (not illustrated) provided in the flow control device 11, or determining which flow control rule to apply.

Further, the flow information control unit 111 can receive messages other than the packet reception notification. For example, when a rule which disappears after a certain period of time is included in the flow control rules in the packet transfer device 12, the flow information control unit 111 can receive a message transmitted from the packet transfer device 12 when the rule disappears.

The reception time management unit 112 manages a packet reception notification reception time when the flow information control unit 111 receives a packet reception notification. More specifically, the reception time management unit 112 associates a flow identifier transmitted from the flow information control unit 111 and a packet reception notification reception time with a communication identifier of communication to be measured corresponding to the flow identifier, and holds them. It is desirable that the flow control device 11 has a function unit for measuring a packet reception notification reception time. In this case, the function unit may be provided in the reception time management unit 112 or may be provided as other function unit.

The round-trip delay time calculation unit 113 calculates at least one round-trip transmission delay time between two devices among the communication device 13A, the communication device 13B and the packet transfer device 12 based on a plurality of packet reception notification reception times. More specifically, the round-trip delay time calculation unit 113 calculates a round-trip transmission delay time of communication between two devices based on a plurality of pairs of the flow identifier of a flow to be measured and a packet reception notification reception time held in the reception time management unit 112. Further, the round-trip delay time calculation unit 113 has a function of generating a flow control rule for measuring a transmission delay time based on the flow identifier of a flow to be measured, a flow control rule, and a packet reception notification reception time, and transmitting the flow control rule to the flow information control unit 111. Herein, the flow control rule for measuring a transmission delay time is a flow control rule of, when the packet transfer device 12 receives again a packet belonging to the same flow, transmitting a packet reception notification to the flow control device 11 again. In the following, any one of the round-trip transmission delay times between the communication device 13A and the communication device 13B, between the communication device 13A and the packet transfer device 12, and between the communication device 13B and the packet transfer device 12 may be denoted as first round-trip transmission delay time.

Operations

FIG. 3 is a flowchart illustrating the operations of the flow control device 11 according to the first exemplary embodiment by way of example. The operations of the flow control device 11 will be described below with reference to FIG. 3.

The flow information control unit 111 in the flow control device 11 receives, from the packet transfer device 12, a packet reception notification indicating that the packet transfer device 12 receives a packet from either the communication device 13A or the communication device 13B (step S101).

The flow information control unit 111 then determines a flow control rule to be notified to the packet transfer device 12 in response to the received packet reception notification (step S102). For example, when the packet transfer device 12 receives a packet belonging to the same flow again, the flow information control unit 111 can determine a flow control rule of transmitting a packet reception notification to the flow control device 11 again in step S102.

The round-trip delay time calculation unit 113 then calculates the first round-trip transmission delay time between two devices among the communication device 13A, the communication device 13B, and the packet transfer device 12 based on a plurality of packet reception notification reception times managed by the reception time management unit 112 (step S103).

A specific example of the operation in step S103 will be described with reference to FIG. 4. In FIG. 4, packet exchange between the communication devices 13 and the packet transfer device 12 is indicated in broken lines and packet exchange between the packet transfer device 12 and the flow control device 11 is indicated in solid lines.

A round-trip transmission delay time RTT1 (in white bold line) between the communication device 13B and the packet transfer device 12 is a difference between time Ta1 when the packet transfer device 12 transmits a first packet to the communication device 13B and time Ta2 when the packet transfer device 12 receives a second packet from the communication device 13B.

Mathematical Formula 1

$$RTT_1 = T_{a1} - T_{a2} \quad \text{Formula 1}$$

According to the first exemplary embodiment, the flow control device 11 calculates RTT1' (in black bold line) which is a temporal difference between time Ta1' when a first packet reception notification transmitted from the packet transfer device 12 is received and time Ta2' when a second packet reception notification transmitted from the packet transfer device 12 is received. Herein, if it is assumed that a round-trip transmission delay time between the packet transfer device 12 and the flow control device 11 and an in-device processing time in the flow control device 11 after receiving the first packet reception notification and up until transmitting a first flow control rule can be negligibly shorter than RTT1, RTT1' can be approximated as RTT1.

Mathematical Formula 2

$$RTT_1 \approx RTT_1' = T_{a1}' - T_{a2}' \quad \text{Formula 2}$$

The flow control device 11 sets a predetermined time as threshold, and may determine whether the time is negligibly short or lowers the threshold. Further, the flow control device 11 may make the determination based on the number of packet transfer devices 12 on the path between the communication device 13A and the communication device 13B. This problem can be solved by use of a flow control device according to a fifth exemplary embodiment.

Similarly, the flow control device 11 calculates RTT2' (in black bold line) which is a temporal difference between Ta2' when the second packet reception notification is received and time Ta3' when a third packet reception notification is received. Then approximation is made based on the value thereby to calculate a round-trip transmission delay time RTT2 between the communication device 13A and the packet transfer device 12. Further, the flow control device 11 calculates a temporal difference (RTT1'+RTT2') (in black bold line) between time Ta1' when the first packet reception notification is received and time Ta3' when the third packet reception notification is received. Then approximation is made based on the value thereby to calculate a round-trip transmission delay time (RTT1+RTT2) between the communication device 13A and the communication device 13B.

The flow control device 11 may perform the operation in step S102 after the operation in step S103. That is, the flow information control unit 111 may determine a flow control rule to be notified to the packet transfer device 12 based on the first round-trip transmission delay time calculated by the round-trip delay time calculation unit 113.

The nature of the present invention described in the present exemplary embodiment may be to find a temporal difference in packet reception notification time in the flow control device 11.

Advantage

An advantage of the present invention is that a round-trip transmission delay time in a period in which the flow control device is not at an endpoint can be obtained by one packet transfer device and the flow control device managing the same.

This is because a round-trip transmission delay time in a period to be measured can be approximated based on a time when the flow control device receives a packet reception notification from the packet transfer device.

Second Exemplary Embodiment

Details of the communication system described according to the first exemplary embodiment will be described according to a second exemplary embodiment by way of example.

Structure

The second exemplary embodiment of the present invention will be described below with reference to the drawings.

The communication system according to the present exemplary embodiment of the present invention includes a flow control device 21, a packet transfer device 22, the communication device 13A, and the communication device 13B among the components in the communication system according to the first exemplary embodiment illustrated in FIG. 1. The communication device 13A and the communication device 13B are the same devices as in the first exemplary embodiment.

FIG. 5 is a diagram illustrating an exemplary structure of the packet transfer device 22 according to the second exemplary embodiment of the present invention. The packet transfer device 22 includes a function unit (a packet transfer unit 221) for obtaining a flow control rule by use of the communication identifier included in a packet or part of it and transferring a packet according to the flow control rule, and a function unit (a flow control rule management unit 222) for associating the communication identifier or part of it with the flow control rule for management. In the following, the communication identifier included in a packet or part of it will be denoted as flow identifier.

The packet transfer unit 221 extracts the flow identifier from a received packet, asks the flow control rule management unit 222 about a flow control rule, and transfers a packet according to the flow control rule received from the flow control rule management unit 222. When an instruction to change the communication identifier is made in the flow control rule, the packet transfer unit 221 may make the change.

The flow control rule management unit 222 answers a corresponding flow control rule to the inquiry of the flow control rule from the packet transfer unit 221. Further, when not holding a corresponding flow control rule, the flow control rule management unit 222 asks the flow control device 21, and can be controlled for addition, deletion, or update of a flow control rule by the flow control device 21.

Figure 6:
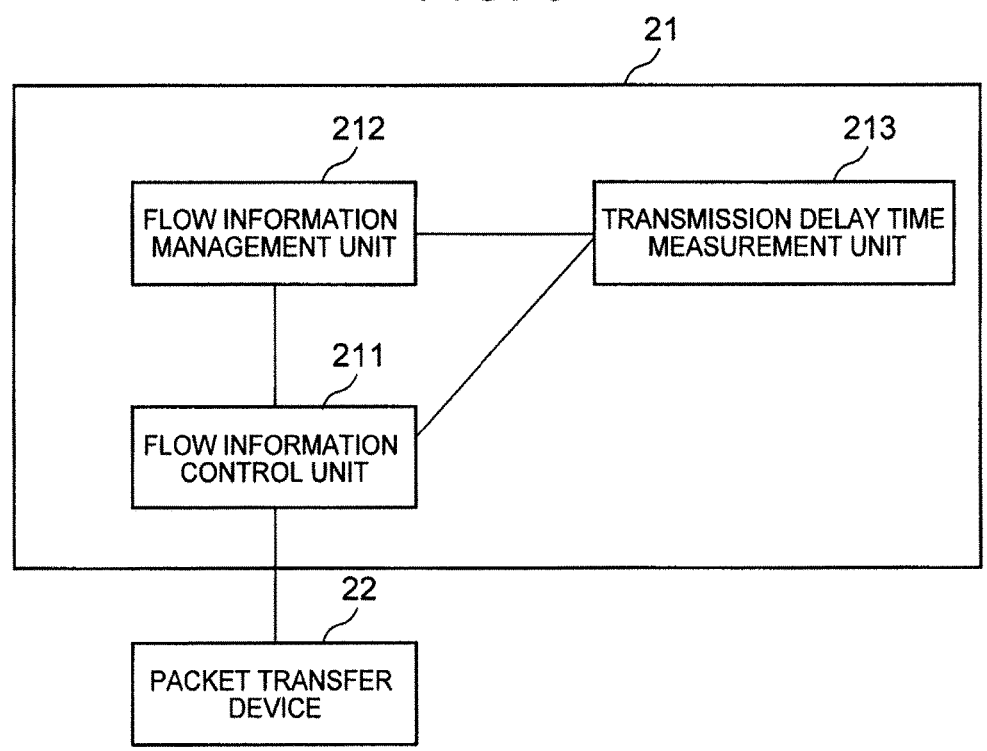
FIG. 6 It depicts a diagram illustrating a structure of a flow control device according to the second exemplary embodiment.

FIG. 6 is a diagram illustrating an exemplary structure of the flow control device 21 according to the second exemplary embodiment of the present invention. The flow control device 21 includes a function unit (a flow information management unit 212) for managing communication information in units of flow discriminated by a flow identifier, a function unit (a flow information control unit 211) for controlling the flow control rules in the packet transfer device 22 by use of the flow information management unit 212, and a function unit (a transmission delay time measurement unit 213) for calculating a temporal difference between a plurality of packet reception notification reception times and calculating a round-trip transmission delay time between one communication device 13 or the packet transfer device 22 and the other communication device 13.

Figure 7:
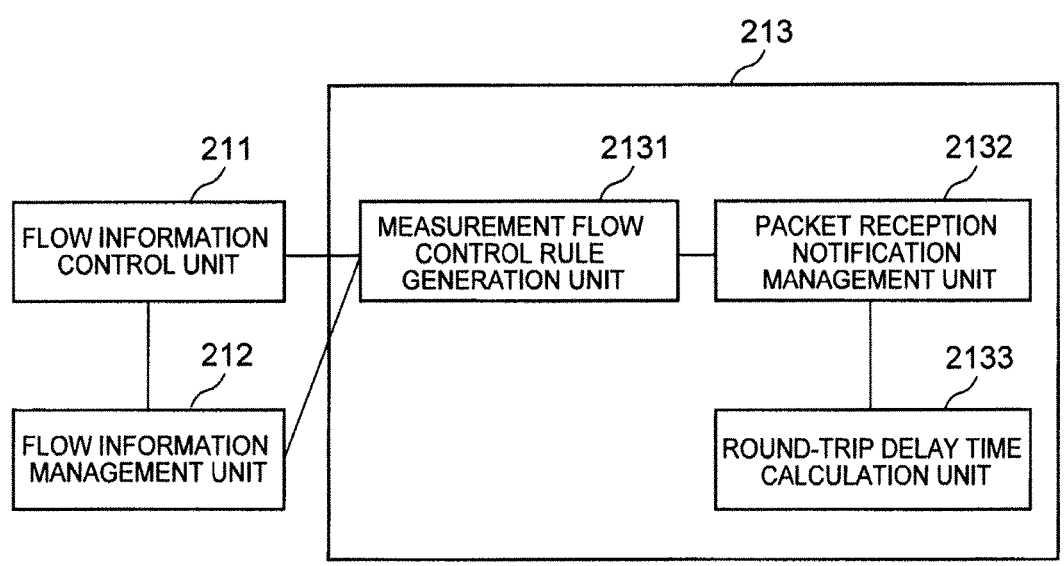
FIG. 7 It depicts a diagram illustrating a structure of a transmission delay time measurement unit according to the second exemplary embodiment.

FIG. 7 is a diagram illustrating an exemplary structure of the transmission delay time measurement unit 213 according to the second exemplary embodiment of the present invention. The transmission delay time measurement unit 213 includes a function unit (a packet reception notification management unit 2132) for managing a flow to be measured of communication to be measured and its packet reception notification time, a function unit (a round-trip delay time calculation unit 2133) for calculating a round-trip transmission delay time between one communication device 13 or the packet transfer device 22 and the other communication device 13, and a function unit (a measurement flow control rule generation unit 2131) for generating a flow control rule for a flow to be measured based on a measurement instruction from the round-trip delay time calculation unit 2133 with reference to the flow control rule of the flow information management unit 212.

Herein, the flow information control unit 111 among the function units provided in the flow control device 11 according to the first exemplary embodiment corresponds to the flow information control unit 211 according to the second exemplary embodiment. Further, the reception time management unit 112 according to the first exemplary embodiment corresponds to the packet reception notification management unit 2132 provided in the transmission delay time measurement unit 213 according to the second exemplary embodiment. The round-trip delay time calculation unit 113 according to the first exemplary embodiment corresponds to the round-trip delay time calculation unit 2133 provided in the transmission delay time measurement unit 213 according to the second exemplary embodiment. The flow information management unit 212 holds the flow control rules corresponding to the flow identifiers, and answers the presence of a flow control rule or a flow control rule in response to an inquiry from other means. The presence of transmission delay time measurement can be set in a flow control rule.

The flow information control unit 211 is communicable with the packet transfer device 22, obtains a flow control rule heled in the flow information management unit 212 or a flow control rule processed in the transmission delay time measurement unit 213 by use of a flow identifier, and controls the flow control rules in the packet transfer device 22.

The transmission delay time measurement unit 213 generates a flow control rule for measuring a transmission delay time based on the flow identifier of the flow to be measured, the flow control rule, and the packet reception notification reception time, and transmits the flow control rule to the flow information control unit 211. Further, the transmission delay time measurement unit 213 calculates a round-trip transmission delay time between one communication device 13 or the packet transfer device 22 and the other communication device 13 based on the held flow identifier of the flow to be measured and the packet reception notification reception time.

The measurement flow control rule generation unit 2131 in the transmission delay time measurement unit 213 transmits the flow identifier, the flow control rule, and the packet reception notification reception time which are obtained from the flow information management unit 212 or the flow information control unit 211 to the packet reception notification management unit 2132. Further, the measurement flow control rule generation unit 2131 changes the flow control rule obtained from the flow information management unit 212 based on the information on the flow to be measured of communication to be measured held in the packet reception notification management unit 2132, and transmits a flow control rule of the flow to be measured to the flow information control unit 211.

The packet reception notification management unit 2132 associates the flow identifier transmitted from the measurement flow control rule generation unit 2131 and the packet reception notification reception time with the communication identifier of communication to be measured corresponding to the flow identifier, and holds them.

The round-trip delay time calculation unit 2133 calculates a round-trip transmission delay time between one communication device 13 or the packet transfer device 22 and the other communication device 13 based on the time when the packet reception notification of the flow to be measured for communication to be measured held in the packet reception notification management unit 2132 is received.

Operations

The entire operations of the present exemplary embodiment will be described below.

An operation of holding a time when a packet reception notification caused in communication to be measured between the communication device 13A and the communication device 13B is received will be first described in detail with reference to FIG. 4.

A first packet transmitted from the communication device 13A to the communication device 13B reaches the packet transfer device 22.

The packet transfer device 22 asks the flow control rule management unit 222 about a flow control rule for the received packet. When a flow control rule corresponding to the received packet is not present or when a packet reception notification to the flow control device 21 is defined in a flow control rule corresponding to the receive packet, the flow control rule management unit 222 transmits a first packet reception notification to the flow control device 21.

The operations of the flow control device 21 will be described in detail with reference to the flowchart of FIG. 8.

The flow control device 21 receives the first packet reception notification from the flow information control unit 211 (step S201).

The flow information control unit 211 asks the flow information management unit 212 about a flow control rule for the received first packet reception notification (step S202).

The flow information management unit 212 determines whether the flow is to be measured with reference to the flow information based on the information on the received first packet reception notification (step S203). When the flow is not to be measured, the flow information management unit 212 notifies the flow control rule held in the flow information to the flow information control unit 211 (step S204). When the flow is to be measured, the flow information management unit 212 notifies the information on the first packet reception notification and a corresponding flow control rule to the transmission delay time measurement unit 213.

The measurement flow control rule generation unit 2131 in the transmission delay time measurement unit 213 asks the packet reception notification management unit 2132 about the information on communication to be measured based on the information on the received first packet reception notification, its corresponding flow control rule, and the time when the first packet reception notification is received (step S205). The packet reception notification management unit 2132 does not hold the information on communication to be measured including the information on the flow to be measured, and thus holds the information on communication to be measured including the information on the first packet reception notification and its reception time, and answers "no flow" to the measurement flow control rule generation unit 2131. The measurement flow control rule generation unit 2131 overwrites the rule of transferring a packet as a cause of notification and the rule of making a packet reception notification on re-reception on the flow control rule for the first packet reception notification, and notifies them to the flow information control unit 211 (step S206). FIG. 9 illustrates exemplary information on communication to be measured held in the packet reception notification management unit 2132 in step S206. Means for holding the information on communication to be measured may be a different form from a table. A flow identifier is included in the packet reception notification information, and a flow identifier 13ab indicates a flow transmitted from the communication device 13A to the communication device 13B. A packet reception notification reception time is when the flow control device 21 receives a packet reception notification, and a time when the first packet reception notification is received is assumed as packet reception notification reception time Ta1. A communication identifier is given to a plurality of flows to be measured having the same endpoint, and an identifier of communication to be measured between the communication device 13A and the communication device 13B is assumed as communication identifier A.

The flow information control unit 211 in the flow control device 21 transmits the first flow control rule for the first packet reception notification to the packet transfer device 22 by use of the received flow control rule.

The packet transfer device 22 transfers the first packet to the communication device 13B according to the first flow control rule. The communication device 13B which receives the first packet transmits a second packet to the communication device 13A on the reception and the packet reaches the packet transfer device 12.

The packet transfer device 22 can employ, as a procedure of transmitting the second packet to the communication device 13B which receives the first packet, a protocol in which packet exchange is made between the communication devices more than one and half round-trips such as 3-way handshake. With the use of the protocol, the communication device 13B which receives the first packet can transmit the second packet to the communication device 13A on reception of the first packet. An example of the protocol is TCP (Transmission Control Protocol). When 3-way handshake is conducted in TCP, the first packet corresponds to a SYN packet and the second packet corresponds to a SYN/ACK packet. A third packet described below corresponds to an ACK packet. This is similarly applicable also in other exemplary embodiments of the present invention.

Further, the procedure of 3-way handshake may be used also at the start of communication in a higher-order protocol than user datagram protocol (UDP), not limited to TCP. The higher-order protocol is session initiation protocol (SIP) or the like, for example.

The procedure of establishing connection by use of 3-way handshake in TCP or SIP is well known to those skilled in the art in this field, and thus a description thereof will be omitted.

As described above, the procedure of causing the communication device 13B which receives the first packet to transmit the second packet to the communication device 13A on reception of the first packet can be realized by any protocol in which packet exchange is made between the communication devices more than one and half round-trips. Thus, the protocol is not limited to TCP or UDP.

The packet transfer device 12 transmits a second packet reception notification to the flow control device 21 similarly as when receiving the first packet.

The flow control device 21 receives the second packet reception notification in the flow information control unit 211, and notifies a flow control rule corresponding to the information on the second packet reception notification to the transmission delay time measurement unit 213 in the same procedure as for the first packet reception notification (step S201 to step S203).

The measurement flow control rule generation unit 2131 in the transmission delay time measurement unit 213 asks the packet reception notification management unit 2132 about the information on communication to be measured based on the flow control rule corresponding to the information on the received second packet reception notification and the time when the second packet reception notification is received (step S205).

The packet reception notification management unit 2132 holds the information on communication to be measured including the information on the flow to be measured in the opposite direction to the flow to be measured, and thus holds the information on communication to be measured including the information on the second packet reception notification and its reception time thereby to answer "flow in the opposite direction" to the measurement flow control rule generation unit 2131. The measurement flow control rule generation unit 2131 notifies the flow control rule corresponding to the second packet reception notification to the flow information control unit 211 (step S207).

FIG. 10 illustrates exemplary information on communication to be measured held in the packet reception notification management unit 2132 in step S207. The flow identifier 13ba indicates a flow to be measured transmitted from the communication device 13B to the communication device 13A. Packet reception notification reception time Ta2 indicates a time when the second packet reception notification is received in the flow control device 21.

The flow information control unit 211 in the flow control device 21 transmits a second flow control rule corresponding to the second packet reception notification to the packet transfer device 22 by use of the received flow control rule.

The packet transfer device 22 transfers the second packet to the communication device 13A according to the second flow control rule. The communication device 13A which receives the second packet transmits a third packet to the communication device 13B on the reception, and the packet reaches the packet transfer device 22.

The packet transfer device 22 performs the same series of processing as for the first packet, and transmits a third packet reception notification to the flow control device 21.

The flow control device 21 receives the third packet reception notification in the flow information control unit 211, and notifies a flow control rule corresponding to the information on the third packet reception notification to the transmission delay time measurement unit 213 according to the same procedure as for the first packet reception notification (step S201 to step S203).

The measurement flow control rule generation unit 2131 in the transmission delay time measurement unit 213 asks the packet reception notification management unit 2132 about the information on communication to be measured based on the flow control rule corresponding to the information on the received third packet reception notification and the time when the third packet reception notification is received (step S205).

The packet reception notification management unit 2132 holds the information on communication to be measured including the information on the flow to be measured in the same direction as the flow to be measured, and thus holds the information on communication to be measured including the information on the third packet reception notification and its reception time thereby to answer "flow in the same direction" to the measurement flow control rule generation unit 2131. The measurement flow control rule generation unit 2131 adds a rule of not making a packet reception notification when a packet is received for the flow control rule in response to the third packet reception notification, and notifies it to the flow information control unit 211 (step S208).

FIG. 11 illustrates exemplary information on communication to be measured held in the packet reception notification management unit 2132 in step S208. The flow identifier 13ab indicates a flow to be measured transmitted from the communication device 13B to the communication device 13A. Packet reception notification reception time Ta3 indicates a time when the third packet reception notification is received in the flow control device 21.

The procedure of calculating a round-trip transmission delay time between one communication device 13 or the packet transfer device 22 and the other communication device 13 is the same as in the first exemplary embodiment.

Description of Advantage

An advantage of the communication system according to the present exemplary embodiment is that a round-trip transmission delay time in a period in which the flow control device is not at an endpoint can be obtained by one packet transfer device and the flow control device managing the same similarly as in the first exemplary embodiment.

Third Exemplary Embodiment

An example in which OpenFlow is applied to the communication system according to the second exemplary embodiment will be described according to a third exemplary embodiment.

Structure

The third exemplary embodiment of the present invention will be described with reference to the drawings.

Figures 12, 13:
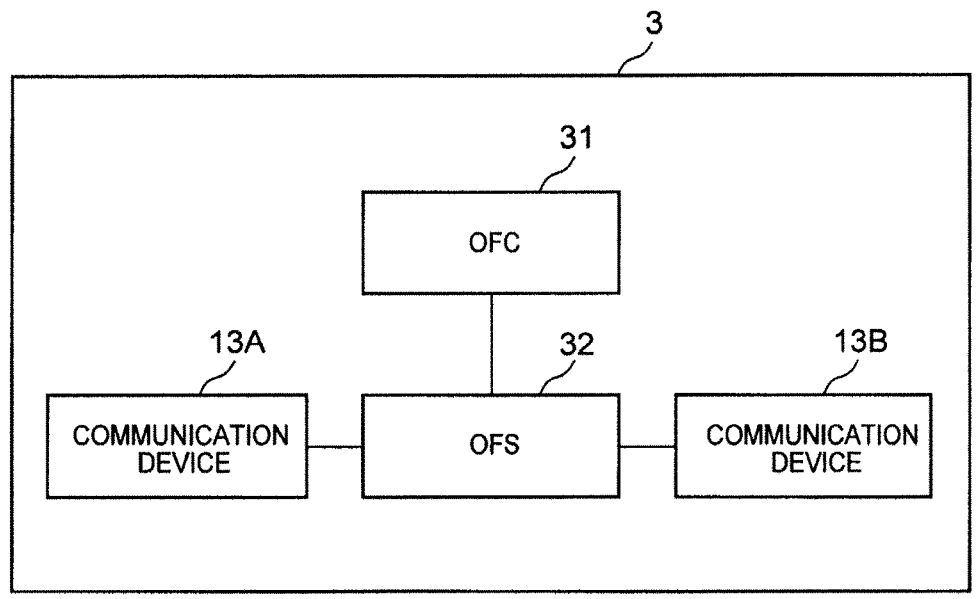
FIG. 12 It depicts a diagram illustrating a structure of a communication system according to a third exemplary embodiment.
FIG. 13 It depicts a diagram illustrating flow entries defined in OpenFlow protocol.

FIG. 12 is a diagram illustrating a structure of a communication system 3 in which OpenFlow is applied to the communication system according to the second exemplary embodiment of the present invention. With reference to FIG. 12, the communication system 3 includes an OpenFlow controller (OFC) 31, an OpenFlow switch (OFS) 32, the communication device 13A, and the communication device 13B.

The OFC 31 is communicable with the OFS 32, and controls flow entries provided in the OFS 32 by use of the OpenFlow protocol.

The OFS 32 is communicable with the OFC 31, the communication device 13A, and the communication device 13B, and transfers a packet according to a flow entry included in a flow table held in the OFS 32. FIG. 13 illustrates the flow entries defined in the OpenFlow protocol. As described above, a flow entry defines therein a set of matching rule (Header Fields) collated with packet header, flow statistical information (Counters), and actions defining processing contents per flow.

In the following description, the components described according to the second exemplary embodiment are denoted with the same reference numerals, and a detailed description thereof will be omitted.

Figure 14:
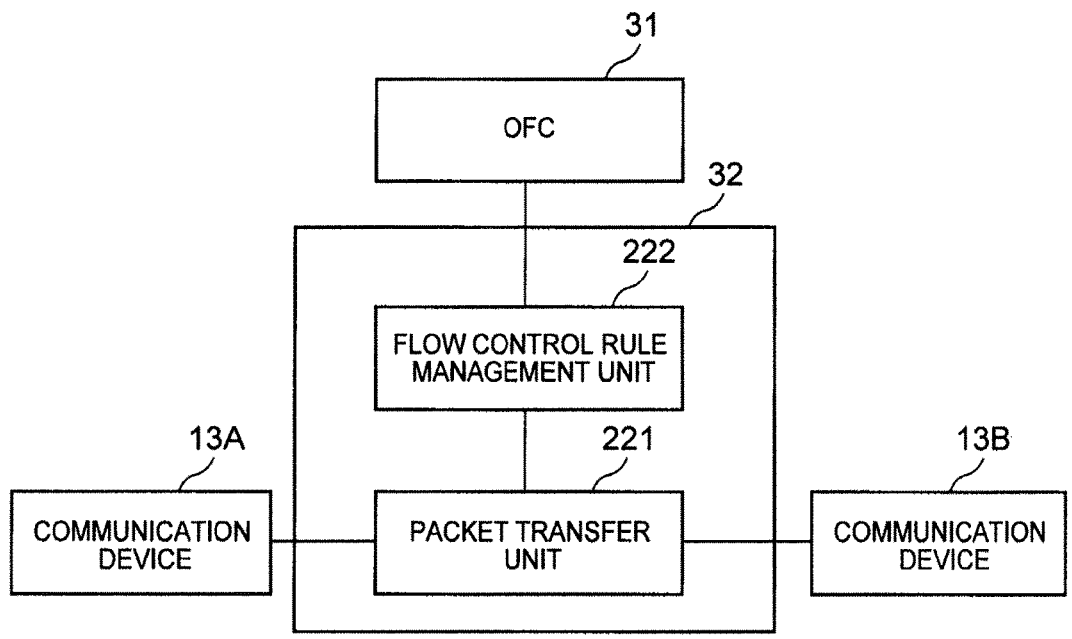
FIG. 14 It depicts a diagram illustrating a structure of an OFS according to the third exemplary embodiment.

FIG. 14 is a diagram illustrating an exemplary structure of the OFS 32 according to the third exemplary embodiment of the present invention. The OFS 32 includes the packet transfer unit 221 and the flow control rule management unit 222. The OFS 32 corresponds to the packet transfer device 22 according to the second exemplary embodiment of the present invention.

Figure 15:
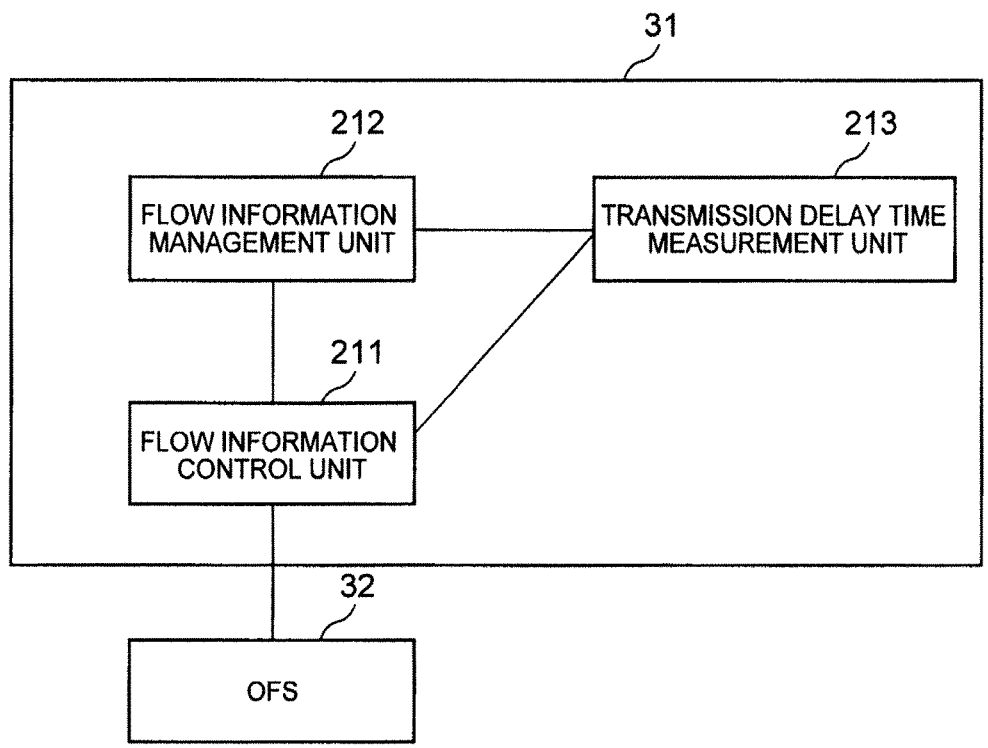
FIG. 15 It depicts a diagram illustrating a structure of an OFC according to the third exemplary embodiment.

FIG. 15 is a diagram illustrating an exemplary structure of the OFC 31 according to the third exemplary embodiment of the present invention. The OFC 31 includes the flow information management unit 212, the flow information control unit 211, and the transmission delay time measurement unit 213. The OFC 31 corresponds to the flow control device 21 according to the second exemplary embodiment of the present invention.

Operations

The operations of the present exemplary embodiment will be described below.

Figure 16:
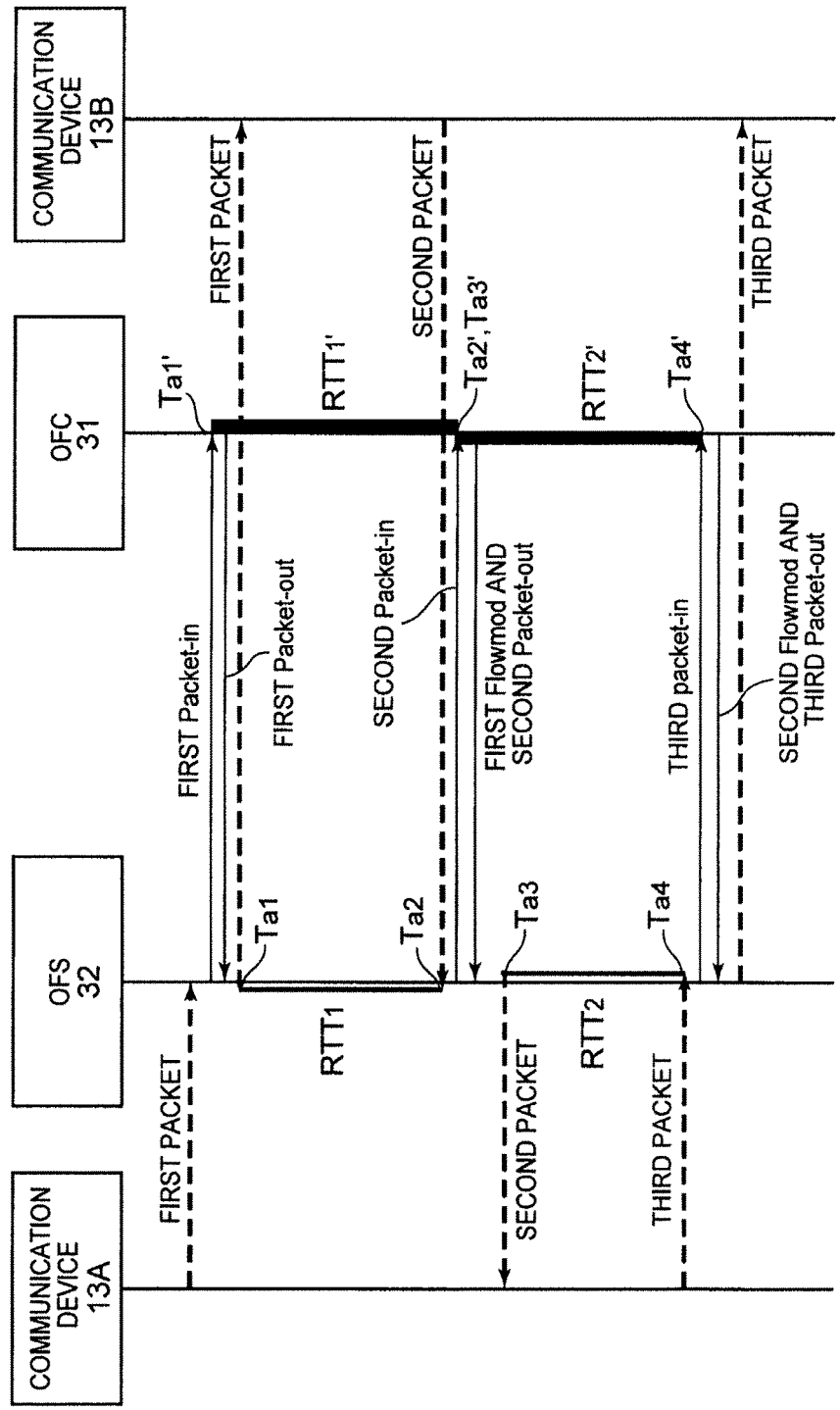
FIG. 16 It depicts a diagram illustrating a sequence between devices according to the third exemplary embodiment.

An operation of holding a time when a Packet-in message caused in communication to be measured between the communication device 13A and the communication device 13B is received will be first described in detail with reference to FIG. 16.

A first packet transmitted from the communication device 13A to the communication device 13B reaches the OFS 32.

The OFS 32 asks the flow control rule management unit 222 about a flow entry for the received packet. When a flow entry corresponding to the received packet is not present or when a flow entry corresponding to the received packet defines therein transmission of a Packet-in message to the OFC 31, the flow control rule management unit 222 transmits a first Packet-in message to the OFC 31.

The OFC 31 searches a flow entry based on the information on the packet header included in the received first Packet-in message. When the flow is to be measured, the OFC 31 generates a flow control rule for the flow to be measured according to the flowchart of flow control rule generation in FIG. 8. Flow control for the first packet according to the present exemplary embodiment includes control of not holding a flow entry for a packet belonging to the same flow as the first packet and control of sending only the first packet to the communication device 13B. A flow entry is not held so that a packet reception notification is made again by a Packet-in message for the same flow. The OFC 31 transmits the control of sending only the first packet to the communication device 13B to the OFS 32 by use of a first Packet-out message.

The OFS 32 which receives the first Packet-out message sends the first packet to the communication device 13B according to a control instruction from the OFC 31.

The communication device 13B which receives the first packet transmits a second packet to the communication device 13A on the reception, and the second packet reaches the OFS 32. The OFS 32 performs the same series of processing as for the first packet, and transmits a second Packet-in message to the OFC 31.

The OFC 31 searches a flow entry based on the information on the packet header included in the received second Packet-in message. When the flow is to be measured and communication to be measured corresponding to the flow to be measured is present, the OFC 31 generates a flow control rule for the flow to be measured according to the flowchart of flow control rule generation in FIG. 8. Flow control for the second packet according to the present exemplary embodiment includes control of holding a first flow entry including the operation (output action) of transferring a packet belonging to the same flow as the second packet to the communication device 13A, and control of sending the second packet to the communication device 13A. The OFC 31 transmits, to the OFS 32, the control of holding the first flow entry by use of a first Flowmod message and the control of sending the second packet to the communication device 13A by use of a second Packet-out message. When the OFS 32 holds the second packet in the memory such as buffer in the OFS 32, the OFC 31 may include the control of sending the second packet to the communication device 13A in the first Flowmod message without the use of the second Packet-out message.

The OFS 32 which receives the first Flowmod message and the second Packet-out message holds the first flow entry for the packet belonging to the same flow as the second packet and sends the second packet to the communication device 13A according to a control instruction from the OFC 31.

The communication device 13A which receives the second packet transmits a third packet to the communication device 13B on reception of the second packet. The third packet then reaches the OFS 32.

The OFS 32 performs the same series of processing as for the first packet, and transmits a third Packet-in message to the OFC 31.

The OFC 31 searches a flow entry based on the information on the packet header included in the received third Packet-in message. When the flow is to be measured, communication to be measured corresponding to the flow to be measured is present, and the same flow is registered, the OFC 31 generates a flow control rule for the flow to be measured according to the flow control rule generation flowchart in FIG. 8. Flow control for the third packet according to the present exemplary embodiment includes control of holding a second flow entry including the operation (output action) of transferring a packet belonging to the same flow as the third packet to the communication device 13B and control of sending the third packet to the communication device 13B. The OFC 31 transmits, to the OFS 32, the control of holding a flow entry by use of a second Flowmod message and the control of sending the third packet to the communication device 13B by use of a third Packet-out message. When the OFS 32 holds the third packet in the memory such as buffer in the OFS 32, the OFC 31 may include the control of sending the third packet to the communication device 13B in the second Flowmod message without the use of the third Packet-out message.

The procedure of calculating a round-trip transmission delay time between two devices among the communication device 13A, the communication device 13B, and the OFS 32 is the same as in the first exemplary embodiment.

Advantages

The communication system 3 according to the third exemplary embodiment described above calculates a round-trip transmission delay time between communication endpoints in the OFS 32 which is a communication relay device and is controllable by the OFC 31.

An advantage of the present invention is that a round-trip transmission delay time in a period in which the OFC is not at an endpoint can be obtained by one OFS and the OFC managing the same.

It is advantageous that a round-trip transmission delay time can be measured without adding a measurement packet between OFSs or between a communication device and an OFS and a network use efficiency is not deteriorated.

It is advantageous that the OFS can be realized by the functions within the scope defined in the OpenFlow protocol, a new device does not need to be added in the network configured in OpenFlow, and cost for measurement can be reduced.

Fourth Exemplary Embodiment

An example in which OpenFlow is applied to the communication system according to the second exemplary embodiment will be described according to the fourth exemplary embodiment.

Structure

The fourth exemplary embodiment of the present invention will be described with reference to the drawings. A structure thereof is the same as that of the communication system 3 according to the third exemplary embodiment, and will be omitted.

Operations

The operations of the present exemplary embodiment will be described below. Most of the operations are the same as in the third exemplary embodiment, and thus the differences from the third exemplary embodiment will be described according to the present exemplary embodiment.

Figure 17:
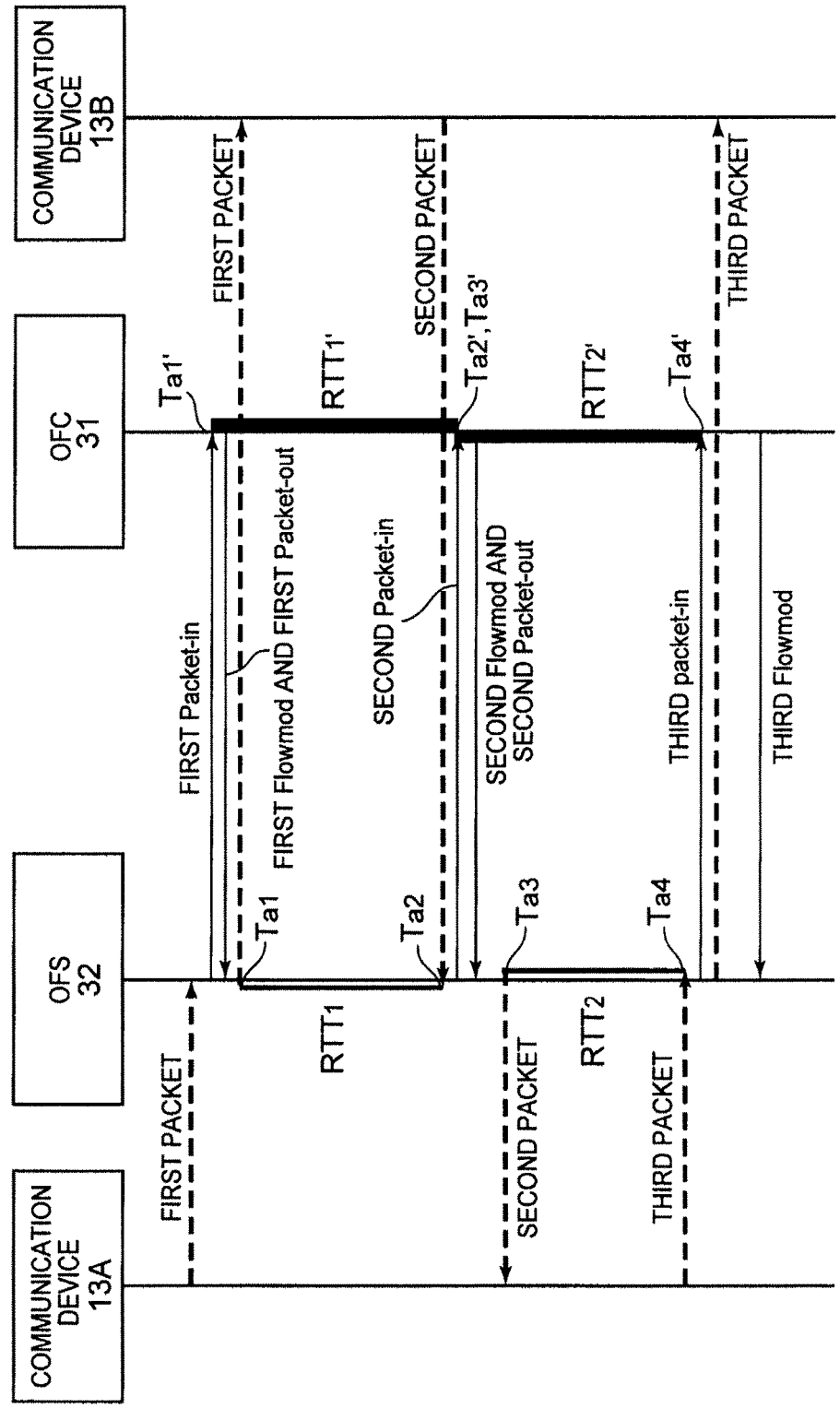
FIG. 17 It depicts a diagram illustrating a sequence between devices according to a fourth exemplary embodiment.

An operation of holding a time when a Packet-in message caused in communication to be measured between the communication device 13A and the communication device 13B is received will be first described in detail with reference to FIG. 17.

Flow control conducted on the OFS 32 by the OFC 31 which receives the first Packet-in message includes control of holding the first flow entry including the operation (output action) of transferring a packet belonging to the same flow as the first packet to the communication device 13B and the operation (controller action) of notifying reception of a packet to the OFC 31, and control of sending the first packet to the communication device 13B. The operation of making a packet reception notification to the OFC 31 is designated in the first flow entry so that the OFC 31 realizes the packet reception notification for the same flow. The OFC 31 transmits, to the OFS 32, the control of holding the first flow entry by use of the first Flowmod message and the control of sending the first packet to the communication device 13B by use of the first Packet-out message. When the OFS 32 holds the first packet in the memory such as buffer in the OFS 32, the OFC 31 can include the control of sending the first packet to the communication device 13B in the first Flowmod message without the use of the first Packet-out message.

The operations of the OFC 31 which receives the second Packet-in message are the same as in the second exemplary embodiment, and will be omitted. According to the present exemplary embodiment, a flow entry set in the OFS 32 on reception of the second Packet-in message is assumed as second flow entry.

Flow control conducted on the OFS 32 by the OFC 31 which receives the third Packet-in message includes control of stopping a packet reception notification for the flow to the OFC 31. The OFS 32 stops a packet reception notification to the OFC 31, thereby alleviating the processing loads on the OFS 32. The OFC 31 transmits, to the OFS 32, control of deleting the Controller action from the first flow entry put in the OFS 32 or control of overwriting a third flow entry in which the Controller action is deleted from the first flow entry by use of a third Flowmod message. The third packet is already transferred to the communication device 13B according to the first flow entry, and thus control of sending the third packet is not required.

Advantage

The communication system according to the present exemplary embodiment is advantageous in that a flow entry for the third packet is registered in the OFS 32 before the third packet is received so that a transmission delay time of the third packet is shorter than in the communication system according to the third exemplary embodiment.

Fifth Exemplary Embodiment

According to a fifth exemplary embodiment, the round-trip transmission delay time between the flow control device and the packet transfer device and the processing delay time in the flow control device are subtracted from the first round-trip transmission delay time thereby to calculate a more accurate round-trip transmission delay time between one communication device or the other communication device and the packet transfer device.

Structure

The fifth exemplary embodiment of the present invention will be described with reference to the drawings.

Figure 18:
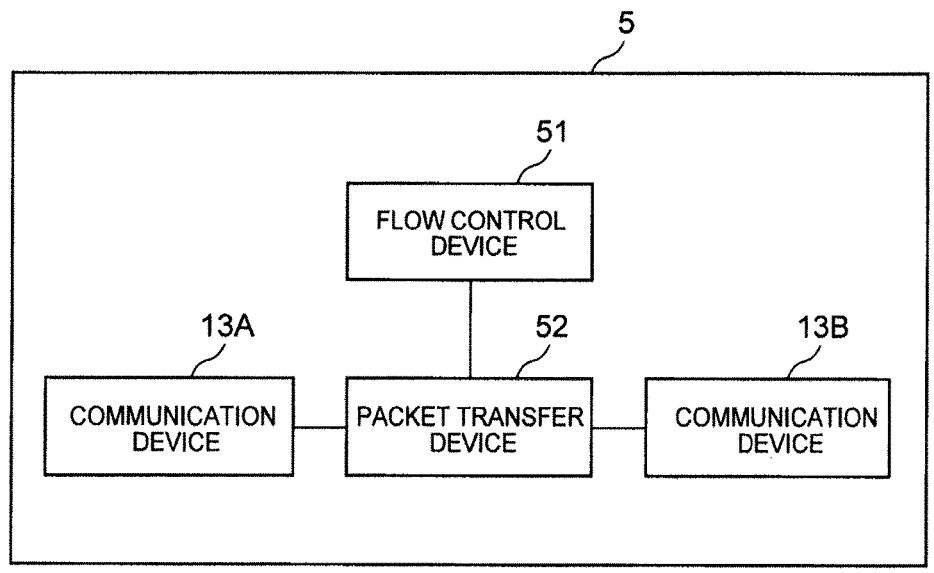
FIG. 18 It depicts a diagram illustrating a structure of a communication system according to a fifth exemplary embodiment.

FIG. 18 is a diagram illustrating a structure of a transmission delay measurement system according to the present exemplary embodiment of the present invention. A transmission delay measurement system 5 according to the fifth exemplary embodiment of the present invention includes a flow control device 51, a packet transfer device 52, the communication device 13A, and the communication device 13B.

In the following, many components are the same as in the first exemplary embodiment and the second exemplary embodiment, and thus the same components are denoted with the same reference numerals and the description thereof will be omitted.

The flow control device 51 further has a function of transmitting, to the packet transfer device 52, a measurement flow control rule which is a flow control rule of transmitting a packet reception notification for measuring a round-trip transmission delay time between the flow control device 51 and the packet transfer device 52 to the flow control device 51 itself in addition to the same functions as the flow control device 21. The flow control device 51 further has a function of measuring a round-trip transmission delay time between the flow control device 51 and the packet transfer device 52 and a processing delay time in the flow control device 51 after receiving a packet reception notification transmitted by the packet transfer device 52 and up until transmitting a flow control rule.

A round-trip transmission delay time between the flow control device 51 and the packet transfer device 52 will be denoted as second round-trip transmission delay time below. Further, a sum of the second round-trip transmission delay time and the processing delay time in the flow control device 51 after receiving a packet reception notification transmitted by the packet transfer device 52 and up until transmitting a flow control rule will be denoted as control delay time below. The second round-trip transmission delay time includes a processing delay time in the packet transfer device 52 after the packet transfer device 52 receives a packet from the flow control device 51 and up until the packet transfer device 52 makes a packet reception notification of the packet to the flow control device 51.

The packet transfer device 52 further has a function of processing a packet according to a flow control rule for the packet asked to send by the flow control device 51 with reference to the flow control rule held in the packet transfer device 52 in addition to the functions of the packet transfer device 22. For example, when the packet transfer device 52 has a measurement flow control rule, if the packet asked to send by the flow control device 51 corresponds to the measurement flow control rule, the packet transfer device 52 transfers the packet according to the measurement flow control rule.

Figure 19:
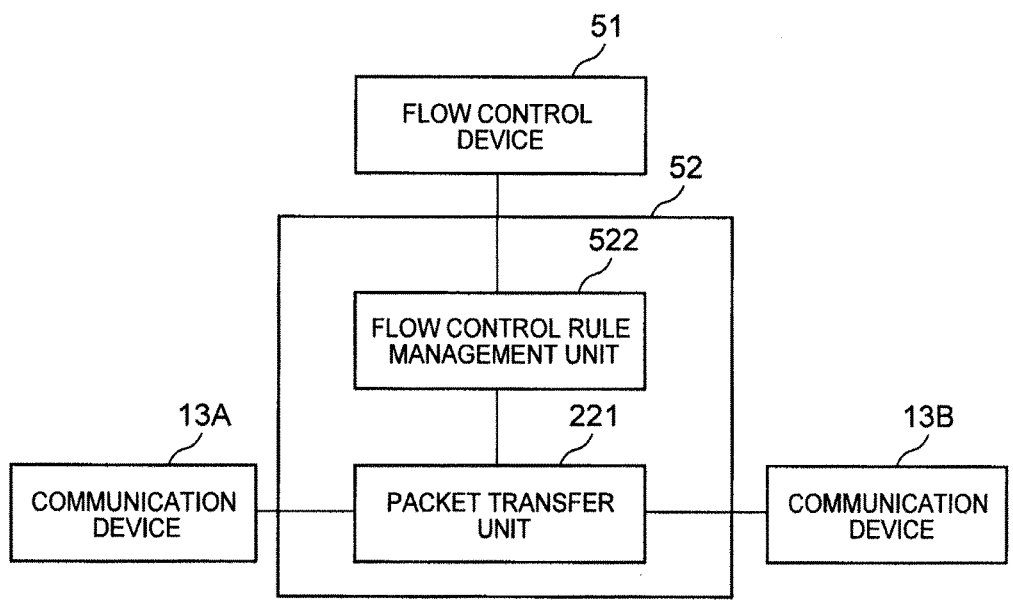
FIG. 19 It depicts a diagram illustrating a structure of a packet transfer device according to the fifth exemplary embodiment.

FIG. 19 is a diagram illustrating a structure of the packet transfer device 52 according to the present exemplary embodiment of the present invention. The packet transfer device 52 includes the packet transfer unit 221 and a flow control rule management unit 522.

The flow control rule management unit 522 further has a function of processing a packet according to a flow control rule for the packet asked to send by the flow control device 51 with reference to the flow control rule held in the flow control rule management unit 522 in addition to the functions of the flow control rule management unit 222.

Figure 20:
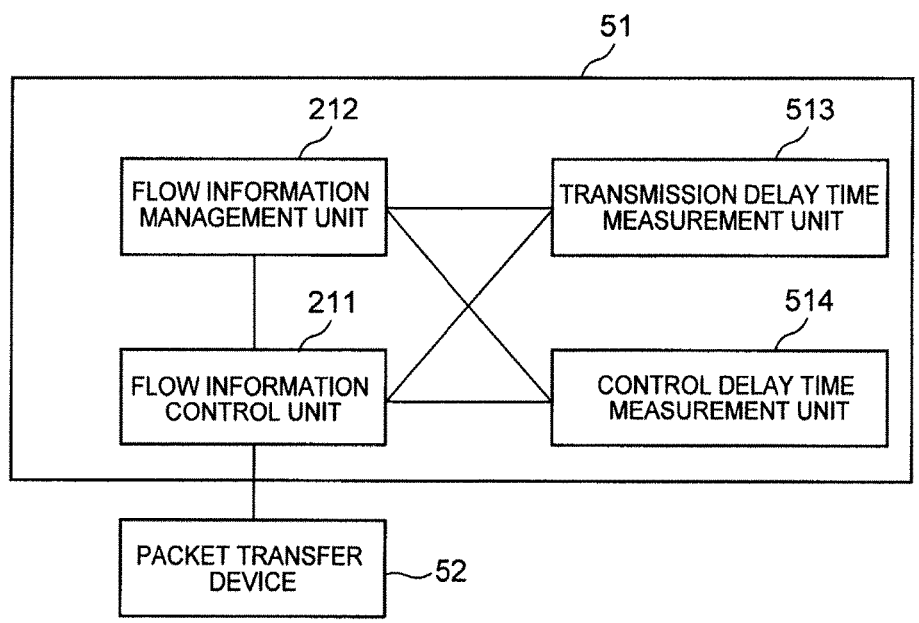
FIG. 20 It depicts a diagram illustrating a structure of a flow control device according to the fifth exemplary embodiment.

FIG. 20 is a diagram illustrating a structure of the flow control device 51 according to the present exemplary embodiment of the present invention. The flow control device 51 includes the flow information management unit 212, the flow information control unit 211, a transmission delay time measurement unit 513, and a control delay time measurement unit 514.

The control delay time measurement unit 514 has a function of measuring a control delay time including the second round-trip transmission delay time between the flow control device 51 and the packet transfer device 52 and the processing delay time in the flow control device 51.

The transmission delay time measurement unit 513 has the same functions as the transmission delay time measurement unit 213. A difference between both is that the transmission delay time measurement unit 513 calculates the first round-trip transmission delay time between two devices among the packet transfer device 52, the communication device 13A, and the communication device 13B by use of the second round-trip transmission delay time measured by the control delay time measurement unit 514 based on the round-trip transmission delay time calculated by the calculation method illustrated in FIG. 4 and the processing delay time in the flow control device 51.

Figure 21:
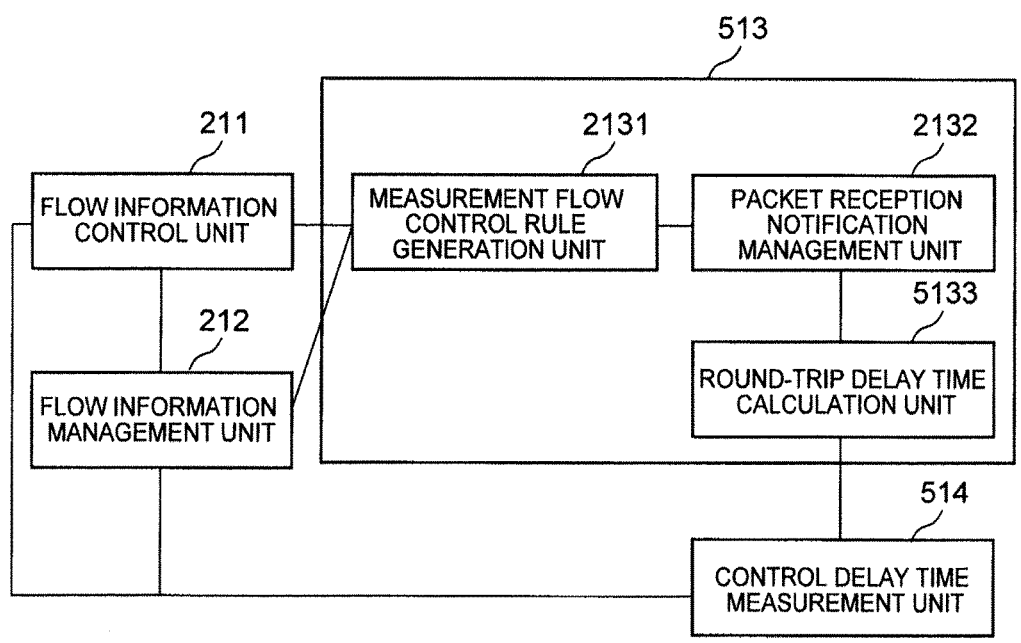
FIG. 21 It depicts a diagram illustrating a structure of a transmission delay time measurement unit according to the fifth exemplary embodiment.

FIG. 21 is a diagram illustrating a structure of the transmission delay time measurement unit 513 according to the fifth exemplary embodiment. The transmission delay time measurement unit 513 includes the measurement flow control rule generation unit 2131, the packet reception notification management unit 2132, and a round-trip delay time calculation unit 5133.

The round-trip delay time calculation unit 5133 has the same functions as the round-trip delay time calculation unit 2133, and a difference between both is that the round-trip delay time calculation unit 5133 has a function of calculating the first round-trip transmission delay time by use of the second round-trip transmission delay time obtained from the control delay time measurement unit 514 and the processing delay time in the flow control device 51.

Figure 22:
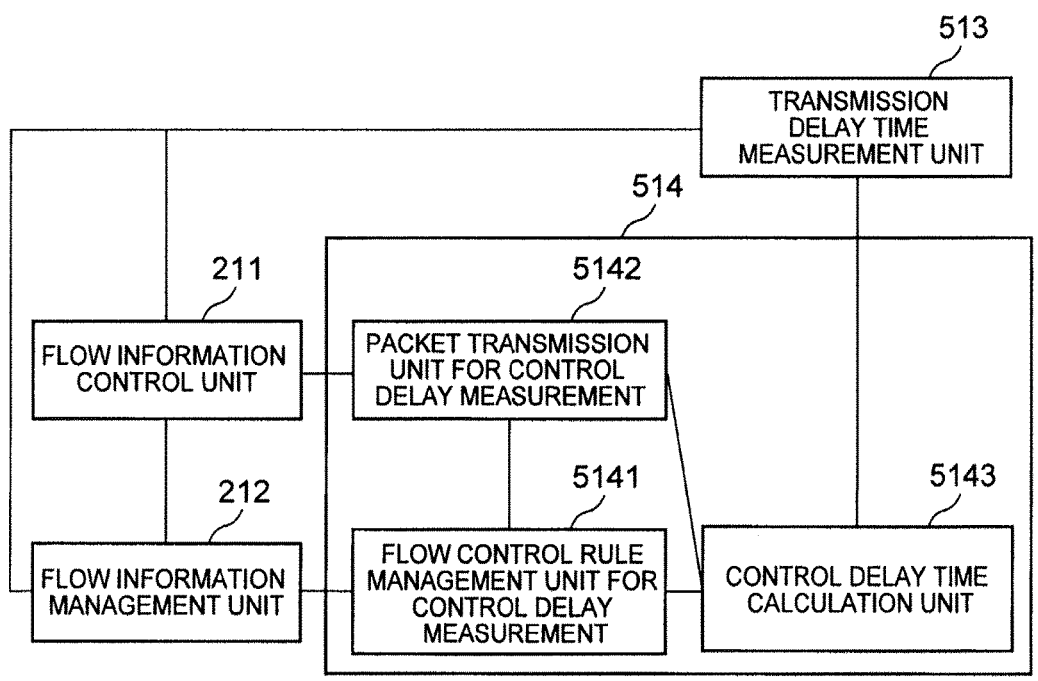
FIG. 22 It depicts a diagram illustrating a structure of a control delay time measurement unit according to the fifth exemplary embodiment.

FIG. 22 is a diagram illustrating a structure of the control delay time measurement unit 514 according to the present exemplary embodiment of the present invention. The control delay time measurement unit 514 includes a flow control rule management unit 5141 for control delay measurement, a packet transmission unit 5142 for control delay measurement, and a control delay time calculation unit 5143.

The flow control rule management unit 5141 for control delay measurement manages a flow control rule for processing a packet belonging to a second delay measurement flow destined for the packet transfer device 52, and receives a packet reception notification from the packet transfer device 52.

The packet transmission unit 5142 for control delay measurement transmits a control signal of instructing the packet transfer device 52 setting the second round-trip delay time measurement flow control rule therein to process a second round-trip delay time measurement packet according to the flow control rule. The control signal includes a control message and a control packet exchanged in C-Plane.

The control delay time calculation unit 5143 calculates the second round-trip transmission delay time based on a time when the control signal obtained from the packet transmission unit 5142 for control delay measurement is sent, and a time when a packet reception notification of the second round-trip delay time measurement packet obtained from the packet transfer device 52 via the flow control rule management unit 5141 for control delay measurement is received.

Further, the control delay time calculation unit 5143 calculates the processing delay time in the flow control device 51 after receiving the first packet reception notification and up until sending the first flow control rule.

Operations

The entire operations of the present exemplary embodiment will be described below in detail.

Figure 23:
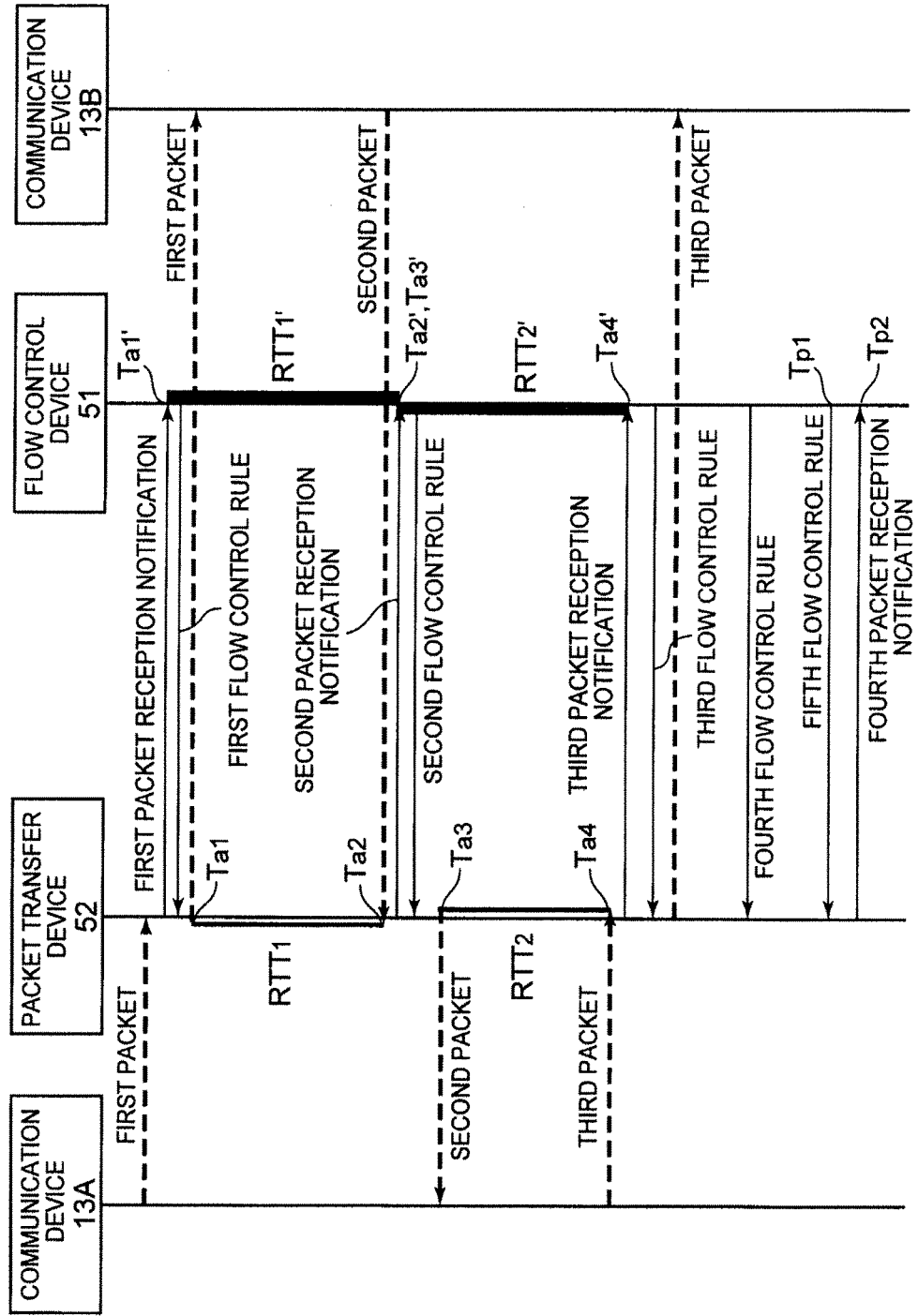
FIG. 23 It depicts a diagram illustrating a sequence between devices according to the fifth exemplary embodiment.

FIG. 23 is a sequence diagram illustrating the operations of the present exemplary embodiment.

An operation of calculating a round-trip transmission delay time between the communication device 13A and the communication device 13B will be described with reference to FIG. 23.

In FIG. 23, the operations after the flow control device 51 receives the first packet reception notification and up until it receives the third packet reception notification are the same as in the first exemplary embodiment and the second exemplary embodiment, and thus the description thereof will be omitted.

How to measure the second round-trip transmission delay time between the flow control device 51 and the packet transfer device 52 will be described below. The flow control device 51 transfers, to the packet transfer device 52, a fourth flow control rule of causing the packet transfer device 52 to perform the processing of "making a packet reception notification to the flow control device 51 when receiving a packet belonging to the second round-trip delay time measurement flow."

The packet transfer device 52 receives the fourth flow control rule and holds the fourth flow control rule.

The flow control device 51 transfers a fifth flow control rule including a packet for measuring the second round-trip delay time to the packet transfer device 52. A time when the fifth flow control rule is transmitted is assumed as Tp1.

The packet transfer device 52 which receives the fifth flow control rule searches a flow control rule held in the flow control rule management unit 522 for the received second round-trip delay time measurement packet. With the searching, the previously-set fourth flow control rule hits, and a fourth packet reception notification is made according to the flow control rule.

When determining that the packet reception notification is for the second round-trip delay time measurement flow, the flow control device 51 which receives the fourth packet reception notification holds time Tp2 when the fourth packet reception notification is received.

The above procedure does not need to be associated with the operation of holding a time when a packet reception notification caused in communication to be measured between the communication device 13A and the communication device 13B is received, and can be independently performed. That is, in FIG. 23, after transferring the third packet to the communication device 13B, the packet transfer device 52 obtains time Tp1 when the fifth flow control rule is received and time Tp2 when the fourth packet reception notification is received. However, the packet transfer device 52 may obtain the times before receiving the first packet from the communication device 13A.

A procedure of calculating a round-trip transmission delay time between one communication device 13 or the packet transfer device 52 and the other communication device 13 will be described below.

Figure 24:
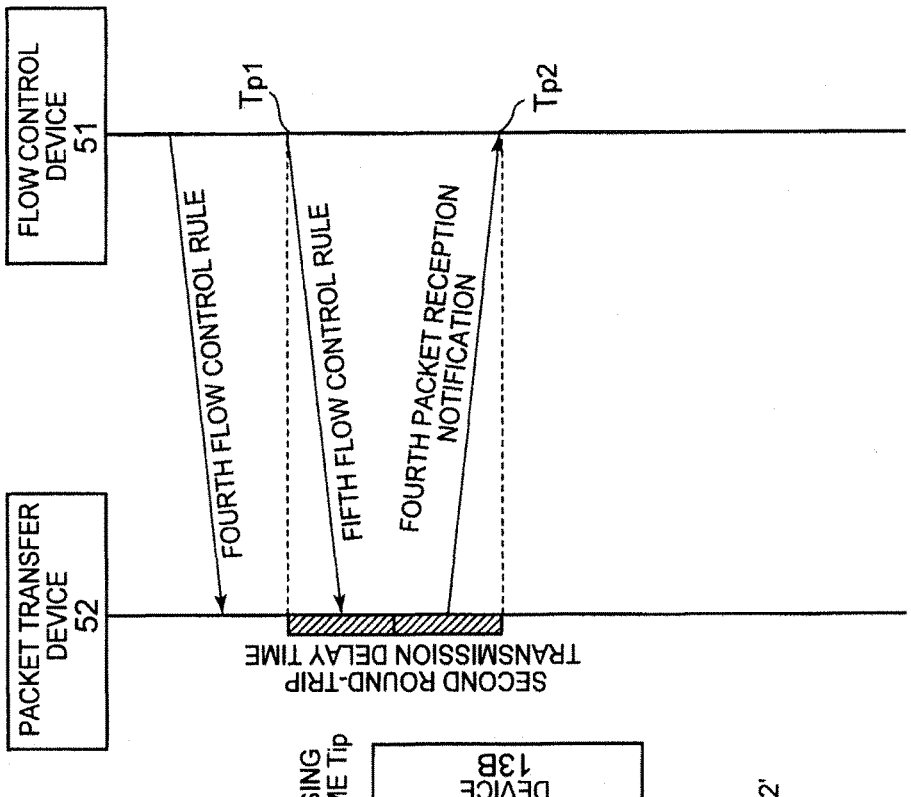
FIG. 24(a) It depicts a diagram illustrating a detailed sequence between devices according to the fifth exemplary embodiment.
FIG. 24(b) It depicts a diagram illustrating a detailed sequence between devices according to the fifth exemplary embodiment.
Figure 24:
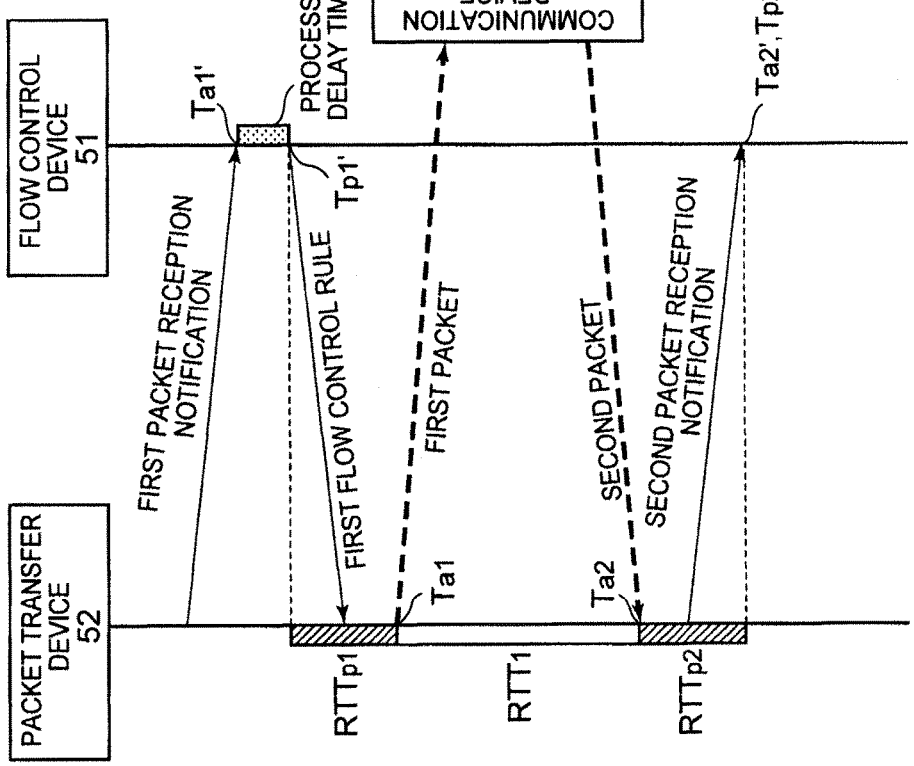

FIGS. 24(a) and 24(b) are diagrams illustrating the transmission delay time between the packet transfer device 52 and the flow control device 51 and the processing time in the flow control device 51. The flow control device 11 according to the first exemplary embodiment calculates RTT1' based on time Ta1' when the first packet reception notification is received and time Ta2' when the second packet reception notification is received. The flow control device 11 then calculates the first round-trip transmission delay time assuming that RTT1' is approximated to actual RTT1 capable of being calculated based on time Ta1 when the packet transfer device 12 sends the first packet and time Ta2 when the second packet transmitted from the communication device 13B is received on reception of the first packet. However, as illustrated in FIG. 24(a), not a little transmission delay time is actually caused between the packet transfer device 52 and the flow control device 51. Specifically, after the flow control device 51 transmits the first flow control rule (transmission time Tp1') and up until the packet transfer device 52 transmits the first packet (transmission time Ta1), a transmission delay time RTTp1 is caused as in the following Formula 3.

Mathematical Formula 3

$$RTT_{p1} = T_{p1}' - T_{a1} \quad \text{Formula 3}$$

Further, after the first packet reception notification is received (reception time Ta1') and up until the first flow control rule is sent (transmission time Tp1'), a processing delay time Tip in the flow control device 51 is caused as in the following Formula 4.

Mathematical Formula 4

$$T_{ip} = T_{a1}' - T_{p1}' \quad \text{Formula 4}$$

Similarly, after the packet transfer device 52 receives the second packet from the communication device 13B (reception time Ta2) and up until the flow control device 51 receives the second packet reception notification (reception time Ta2' or Tp2'), a transmission delay time RTTp2 is caused as in the following Formula 5.

Mathematical Formula 5

$$RTT_{p2} = T_{a2} - T_{a2}' \quad \text{Formula 5}$$

Herein, the processing time Tip in the flow control device 51 as well as RTTp1 and RTTp2 is subtracted from RTT1', thereby calculating more accurate RTT1.

At first, the processing time Tip in the flow control device 51 illustrated in FIG. 24(a) is calculated based on time Ta1' when the first packet reception notification is received and time Tp1' when the first flow control rule is transmitted, which are held in the flow control device 51.

Then, a sum of the transmission delay times RTTp1 and RTTp2 illustrated in FIG. 24(a) is calculated based on time Tp1 when the flow control device 51 transmits the fifth flow control rule to the packet transfer device 52 and time Tp2 when the flow control device 51 receives the fourth packet reception notification from the packet transfer device 52 as illustrated in FIG. 24(b).

Therefore, RTT1 can be found in the following Formula 6.

Mathematical Formula 6

$$RTT_1 = RTT_1' - (T_{ip} + RTT_{p1} + RTT_{p2}) \quad \text{Formula 6}$$

Similarly, the values of the round-trip transmission delay time RTT2 between the packet transfer device 52 and the communication device 13A and the round-trip transmission delay time (RTT2+RTT3) between the communication device 13A and the communication device 13B can be calculated more accurately.

Advantages

An advantage of the communication system according to the present exemplary embodiment is that a round-trip transmission delay time in a period in which the flow control device is not at an endpoint can be obtained by one packet transfer device and the flow control device managing the same similarly as in the first exemplary embodiment.

Further, the first round-trip transmission delay time can be calculated more accurately in consideration of the second round-trip transmission delay time between the packet transfer device 52 and the flow control device 51 and the processing delay time in the flow control device 51.

According to the present exemplary embodiment, with the above structure, a packet for measuring the second round-trip transmission delay time is used for only communication between the flow control device 51 and the packet transfer device 52. Therefore, the packet does not influence the network in which communication is made between the communication device 13A and the communication device 13B. Thus, a deterioration in network use efficiency, which is caused by the occurrence of a measurement packet for measuring a transmission delay time, can be avoided in the network in which communication is made between the communication device 13A and the communication device 13B.

Sixth Exemplary Embodiment

An example in which OpenFlow is applied to the communication system according to the fifth exemplary embodiment will be described according to a sixth exemplary embodiment.

Structure

Figure 25:
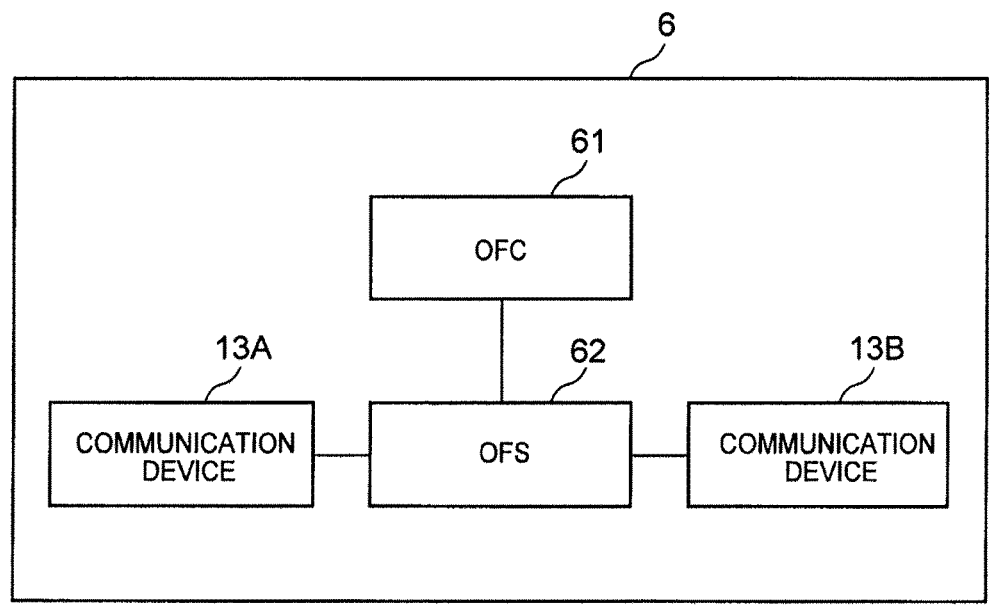
FIG. 25 It depicts a diagram illustrating a structure of a communication system according to a sixth exemplary embodiment.

The sixth exemplary embodiment of the present invention will be described with reference to the drawings. FIG. 25 is a diagram illustrating a structure of a communication system 6 using OpenFlow according to the sixth exemplary embodiment of the present invention. With reference to FIG. 25, the communication system 6 includes an OpenFlow controller (OFC) 61, an OpenFlow switch (OFS) 62, the communication device 13A, and the communication device 13B.

The OFC 61 is communicable with the OFS 62, and controls the OFS 62 by use of the OpenFlow protocol.

The OFS 62 is communicable with the OFC 61, the communication device 13A, and the communication device 13B, and transfers a packet according to a flow entry included in a flow table held in the OFS 62. As described above, FIG. 13 illustrates the flow entries defined in the OpenFlow protocol.

In the following description, the components described according to the fifth exemplary embodiment are denoted with the same reference numerals, and a detailed description thereof will be omitted.

Figure 26:
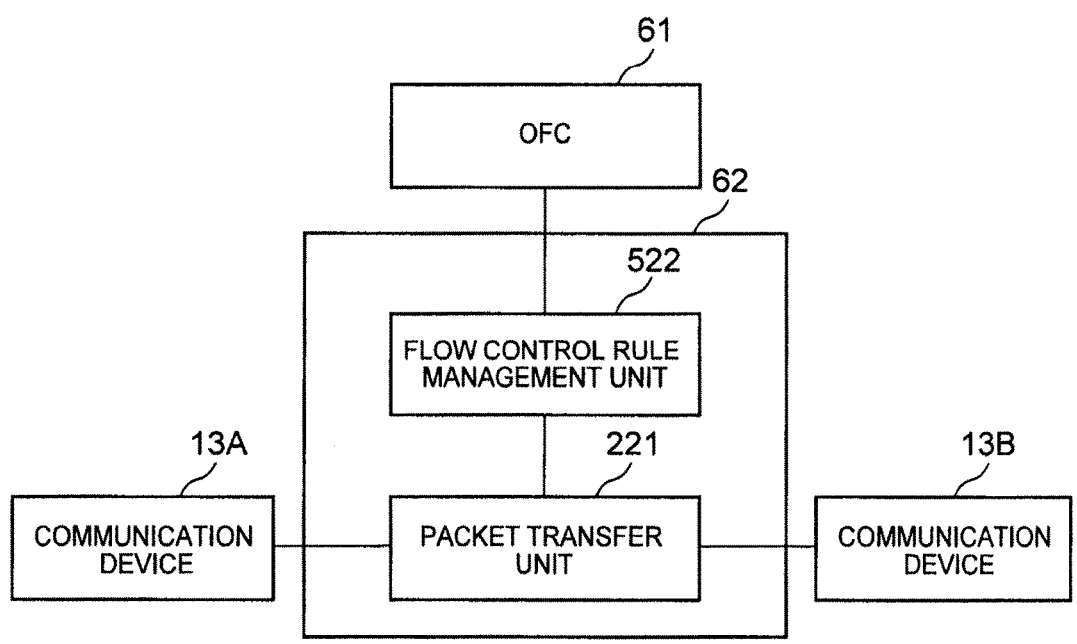
FIG. 26 It depicts a diagram illustrating a structure of an OFS according to the sixth exemplary embodiment.

FIG. 26 is a diagram illustrating an exemplary structure of the OFS 62 according to the sixth exemplary embodiment of the present invention. The OFS 62 includes the packet transfer unit 221 and the flow control rule management unit 522. The OFS 62 corresponds to the packet transfer device 52 according to the fifth exemplary embodiment of the present invention.

Figure 27:
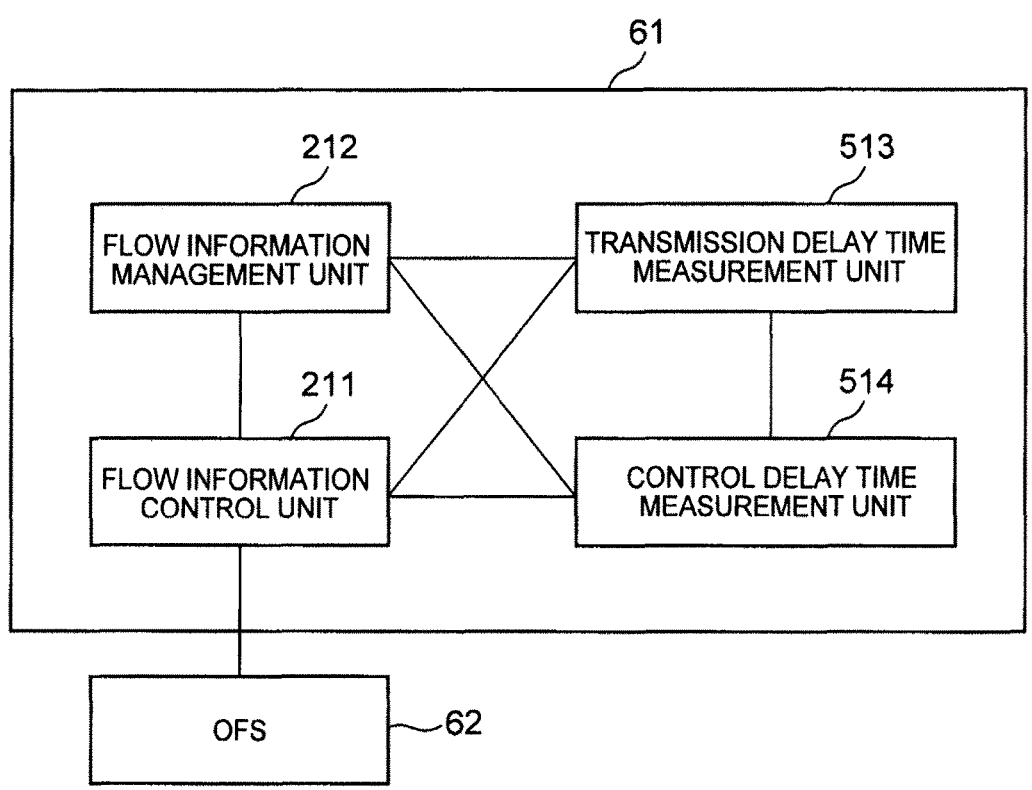
FIG. 27 It depicts a diagram illustrating a structure of an OFC according to the sixth exemplary embodiment.

FIG. 27 is a diagram illustrating an exemplary structure of the OFC 61 according to the sixth exemplary embodiment of the present invention. The OFC 61 includes the flow information management unit 212, the flow information control unit 211, the transmission delay time measurement unit 513, and the control delay time measurement unit 514. The OFC 61 corresponds to the flow control device 51 according to the fifth exemplary embodiment of the present invention.

Operations

The operations of the present exemplary embodiment will be described below.

An operation of calculating a round-trip transmission delay time between the communication device 13A and the communication device 13B will be described in detail with reference to FIG. 28.

Figure 28:
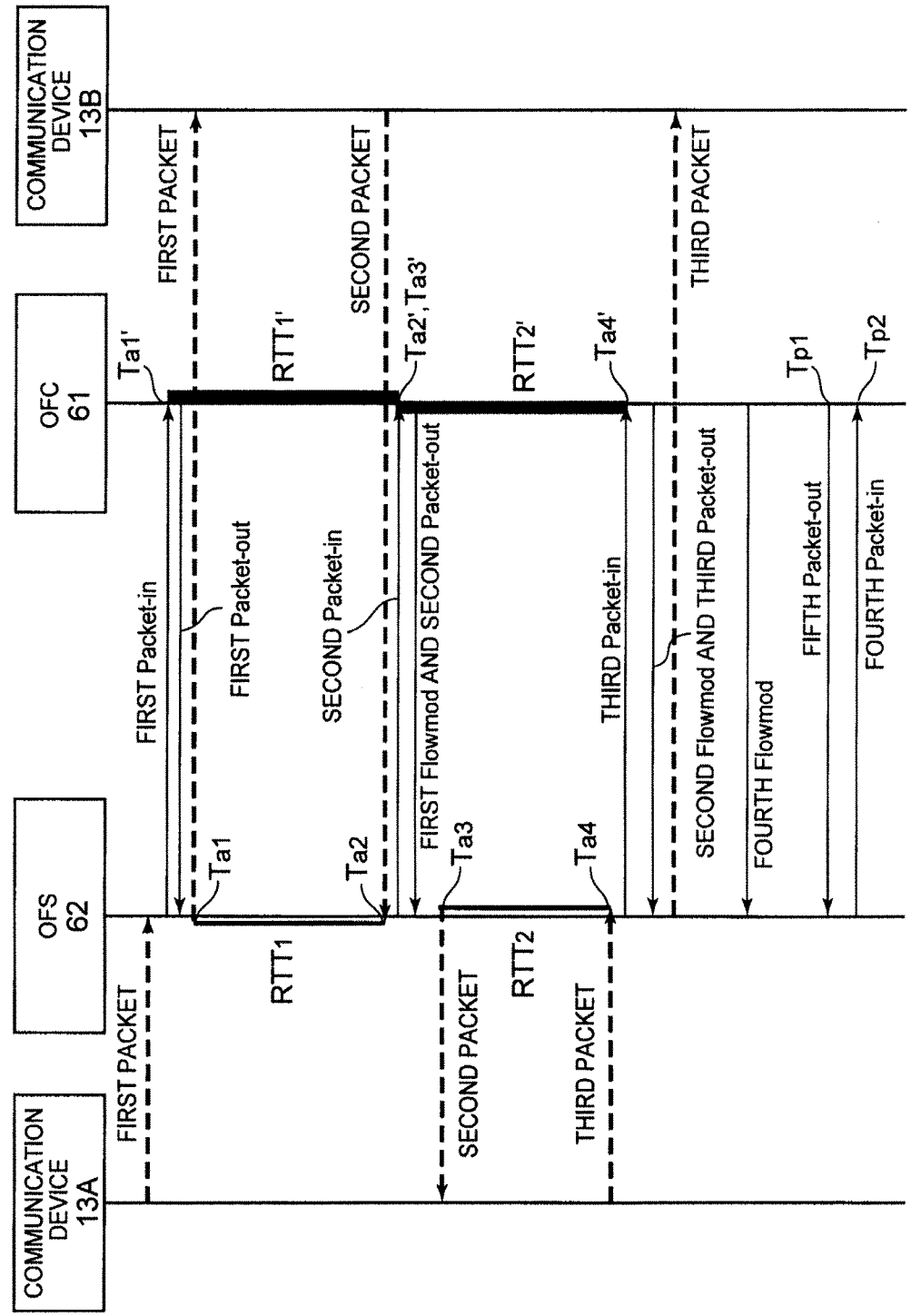
FIG. 28 It depicts a diagram illustrating a sequence between devices according to the sixth exemplary embodiment.

In FIG. 28, a method for obtaining the times Ta1', Ta2', and Ta3' when the first, the second, and the third Packet-in messages are received, respectively, by the OFC 61 is the same as in the third exemplary embodiment or the fourth exemplary embodiment, and thus the description thereof will be omitted.

How to measure the second round-trip transmission delay time between the OFC 61 and the OFS 62 will be described below. Flow control conducted on the OFS 62 by the OFC 61 includes control of holding a fourth flow entry including the operation (Controller action) of notifying reception of a packet belonging to the second delay time measurement flow to the OFC 61. The OFC 61 transmits the control of holding a fourth flow entry to the OFS 62 by use of a fourth Flowmod message.

Then, flow control conducted on the OFS 62 by the OFC 61 includes control (Table action) of processing a packet belonging to the second round-trip delay time measurement flow according to a flow control rule held in the OFS 62. The OFC 61 transmits the control to the OFS 62 by use of a fifth Packet-out message. The OFC 61 holds time Tp1 when the fifth Packet-out message is transmitted.

The OFS 62 which receives the fifth Packet-out message obtains the action of the fourth flow entry with reference to the flow control rules held in the OFS 62 for the packet belonging to the second round-trip delay time measurement flow included in the Packet-out message according to the Table action. The OFS 62 transmits a fourth Packet-in message to the OFC 61 according to the action of the fourth flow entry.

When determining that the flow is the second round-trip delay time measurement flow based on the packet information included in the message, the OFC 61 which receives the fourth Packet-in message holds time Tp2 when the fourth Packet-in message is received. Similarly as in the fifth exemplary embodiment, the above procedure does not need to be associated with the operation of holding a time when a packet reception notification caused in communication to be measured between the communication device 13A and the communication device 13B is received, and is independently performed.

Then, the OFC 61 calculates the first round-trip transmission delay time (RTT1) similarly as in the fifth exemplary embodiment based on Ta1', Ta2', and Ta3' when the first, the second, and the third Packet-in messages are received, respectively, and Tp1 and Tp2 calculated according to the present exemplary embodiment. The detailed calculation method is the same as in the fifth exemplary embodiment and the contents illustrated in FIG. 24, and the description thereof will be omitted.

Advantages

An advantage of the communication system according to the present exemplary embodiment is that a round-trip transmission delay time in a period in which the OFC is not at an endpoint can be obtained by one OFS and the OFC managing the same similarly as in the first exemplary embodiment.

According to the present exemplary embodiment, with the above structure, a packet for measuring the second round-trip transmission delay time is used for only communication between the flow control device 51 and the packet transfer device 52. Therefore, the packet does not influence the network in which communication is made between the communication device 13A and the communication device 13B. Thus, a deterioration in network use efficiency, which is caused by the occurrence of a measurement packet for measuring a transmission delay time, can be avoided in the network in which communication is made between the communication device 13A and the communication device 13B.

Further, it is advantageous that the OFS 62 can be realized by the functions within the scope defined in the OpenFlow protocol, a new device does not need to be added to the network configured in OpenFlow, and cost for measurement can be reduced.

Variant of Exemplary Embodiments

Many variants are assumed for accomplishing the present invention. The structure of the present invention is not limited to the above exemplary embodiments.

When a plurality of packet transfer devices (OFS) are present between the communication device 13A and the communication device 13B and a plurality of paths are present therebetween, the flow control device (OFC) may control a plurality of flow control rules based on the calculated first round-trip transmission delay time thereby to determine a path between the communication device 13A and the communication device 13B. In this case, it is desirable that the flow control device stores RTT in association with the previously-determined paths between the communication devices 13 and is further provided with a function unit for selecting a path based on a plurality of stored RTTs.

The flow control device and the packet transfer device are realized in hardware, software, or a combination thereof. Further, a method for controlling the flow control device and a method for controlling the packet transfer device are also realized in hardware, software, of a combination thereof. Herein, realized in software indicates realized by a computer reading and executing a program.

The program is stored by use of various types of non-transitory computer readable media to be supplied to a computer. The non-transitory computer readable media include various types of tangible storage media. Examples of the non-transitory computer readable media include magnetic recording media (such as flexible disk, magnetic tape, and hard disk drive), magnetooptical recording media (such as magnetooptical disk), compact disc-read only memory (CD-ROM), CD-R, CD-R/W, digital versatile disc-ROM (DVD-ROM), DVD-R, DVD-R/W, and semiconductor memories (such as mask ROM, programmable ROM (PROM), erasable PROM (EPROM), flash ROM, and random access memory (RAM)). Further, the program may be supplied to a computer via various types of transitory computer readable media. Examples of the transitory computer readable media include electric signal, optical signal, and electromagnetic wave. The transitory computer readable media can supply the program to a computer via wired communication path such as electric wire and optical fiber, or wireless communication path.

The exemplary embodiments described above may be accomplished in combination as needed. Further, the present invention is not limited to the exemplary embodiments described above, and can be accomplished in various forms.

The present invention has been described above with reference to the exemplary embodiments and the examples, but the present invention is not limited to the exemplary embodiments and the examples. The structure and details of the present invention can be variously changed within the scope of the present invention understandable to those skilled in the art.

The present application claims the priority based on Japanese Patent Application No. 2014-050987 filed on Mar. 14, 2014, the disclosure of which is all incorporated herein by reference.

REFERENCE SIGNS LIST 1, 2, 3, 5, 6: Communication system
11, 21, 51: Flow control device
12, 22, 52: Packet transfer device
13, 13A, 13B: Communication device
111, 211: Flow information control unit
112: Time information management unit
113, 2133, 5133: Round-trip delay time calculation unit
212: Flow information management unit
213, 513: Transmission delay time measurement unit
221: Packet transfer unit
222, 522: Flow control rule management unit
2131: Measurement flow control rule generation unit
2132: Packet reception notification management unit
31, 61: OFC
32, 62: OFS
514: Control delay time measurement unit
5141: Flow control rule management unit for control delay measurement
5142: Packet transmission unit for control delay measurement
5143: Control delay time calculation unit

The invention claimed is:

1. A flow control device for controlling flow control rules defining processing contents per flow in a packet transfer device for processing packets belonging to a flow between a first communication device and a second communication device, comprising: hardware including at least one memory configured to store instructions: and at least one nail processor configured to execute the instructions to:
   receive a packet reception notification indicating that the packet transfer device receives a packet from at least one of the first communication device and the second communication device from the packet transfer device, and determine a flow control rule to be notified to the packet transfer device in response to the received packet reception notification;
   manage a packet reception notification reception time when the packet reception notification is received; and
   calculate a first round-trip transmission delay time between two devices among the first communication device, the second communication device, and the packet transfer device based on the packet reception notification reception times;
   wherein packet transfer device is notified of a flow control rule of notifying reception of a measurement packet transmitted from the flow control device itself to the flow control device, and
   a second round-trip transmission delay time between the flow control device itself and the packet transfer device is measured based on a time when the measurement packet is transmitted and a time when the measurement packet reception notification transmitted from the packet transfer device is received, and the first round-trip transmission delay time is calculated by use of the second round-trip transmission delay time.

2. The flow control device according to claim 1, for intensively controlling a plurality of the packet transfer devices,
   wherein when a plurality of paths are present between the first communication device and the second communication device, the flow control rule is generated and notified to the packet transfer device such that communication is made in a path with the shortest first round-trip transmission delay time.

3. The flow control device according to claim 1, which is an OpenFlow controller for controlling flow entries of the packet transfer device as an OpenFlow switch,
   wherein the packet reception notification is a Packet-in message defined in OpenFlow protocol, and
   the flow control rule is notified by at least one of a Flowmod message and a Packet-out message defined in OpenFlow protocol.

4. A flow control device for controlling flow control rules defining processing contents per flow in a packet transfer device for processing packets belonging to a flow between a first communication device and a second communication device,
   wherein the flow control device receives a first packet reception notification indicating that the packet transfer device receives a first packet belonging to a flow from the first communication device from the packet transfer device, and
   determines a rule of retransmitting a packet reception notification to the flow control device when the packet transfer device receives again a packet belonging to the same flow as the first packet for the flow control rule in response to the first packet reception notification, and notifies it to the packet transfer device;
   wherein packet transfer device is notified of a flow control rule of notifying reception of a measurement packet transmitted from the flow control device itself to the flow control device, and
   a second round-trip transmission delay time between the flow control device itself and the packet transfer device is measured based on a time when the measurement packet is transmitted and a time when the measurement packet reception notification transmitted from the packet transfer device is received, and the first round-trip transmission delay time is calculated by use of the second round-trip transmission delay time.

5. A flow control device for controlling flow control rules defining processing contents per flow in a packet transfer device for processing packets belonging to a flow between a first communication device and a second communication device, comprising:
   hardware including at least one memory configured to store instructions: and at least one nail processor configured to execute the instructions to: receive a packet reception notification indicating that the packet transfer device receives a packet from at least one of the first communication device and the second communication device from the packet transfer device, and determine a flow control rule to be notified to the packet transfer device in response to the received packet reception notification;
   manage a packet reception notification reception time when the packet reception notification is received; and
   calculate a temporal difference between the packet reception notification reception times;

wherein packet transfer device is notified of a flow control rule of notifying reception of a measurement packet transmitted from the flow control device itself to the flow control device, and a second round-trip transmission delay time between the flow control device itself and the packet transfer device is measured based on a time when the measurement packet is transmitted and a time when the measurement packet reception notification transmitted from the packet transfer device is received, and the first round-trip transmission delay time is calculated by use of the second round-trip transmission delay time.

* * * * *